(12) United States Patent
Luft

(10) Patent No.: US 7,719,995 B2
(45) Date of Patent: May 18, 2010

(54) APPLICATION DRIVEN FAST UNICAST FLOW REPLICATION

(75) Inventor: Siegfried J. Luft, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 409 days.

(21) Appl. No.: 11/517,853

(22) Filed: Sep. 6, 2006

(65) Prior Publication Data

US 2007/0058629 A1 Mar. 15, 2007

Related U.S. Application Data

(60) Provisional application No. 60/719,890, filed on Sep. 9, 2005.

(51) Int. Cl.
*H04L 12/26* (2006.01)
*H04L 12/56* (2006.01)
*G06F 15/16* (2006.01)
*H04N 7/173* (2006.01)

(52) U.S. Cl. ............... 370/252; 370/389; 709/203; 709/219; 725/97

(58) Field of Classification Search .......... None
See application file for complete search history.

(56) References Cited

U.S. PATENT DOCUMENTS

| 4,720,850 A | | 1/1988 | Oberlander et al. |
| 4,893,302 A | | 1/1990 | Hemmady et al. |
| 5,781,550 A | * | 7/1998 | Templin et al. ............ 370/401 |
| 5,892,535 A | * | 4/1999 | Allen et al. ................... 725/36 |
| 6,262,974 B1 | | 7/2001 | Chevalier et al. |
| 6,320,863 B1 | | 11/2001 | Ramfelt |
| 6,389,462 B1 | * | 5/2002 | Cohen et al. ................ 709/218 |
| 6,412,000 B1 | * | 6/2002 | Riddle et al. ................ 709/224 |
| 6,415,329 B1 | * | 7/2002 | Gelman et al. ............. 709/245 |
| 6,493,748 B1 | * | 12/2002 | Nakayama et al. ........ 709/218 |
| 6,502,242 B1 | * | 12/2002 | Howe et al. ................. 725/109 |
| 6,587,470 B1 | | 7/2003 | Elliot et al. |
| 6,591,299 B2 | * | 7/2003 | Riddle et al. ............... 709/224 |
| 6,608,832 B2 | | 8/2003 | Forslow |
| 6,650,621 B1 | * | 11/2003 | Maki-Kullas .............. 370/238 |
| 6,678,281 B1 | | 1/2004 | Chakrabarti et al. |

(Continued)

FOREIGN PATENT DOCUMENTS

CA 1 295 391 2/1992

(Continued)

OTHER PUBLICATIONS

PCT/CA2006/001414, PCT International Search Report and Written Opinion, Dec. 19, 2006.

(Continued)

*Primary Examiner*—Gregory B Sefcheck
(74) *Attorney, Agent, or Firm*—Blakely Sokoloff Taylor & Zafman LLP

(57) ABSTRACT

A technique to replicate unicast flows is described. A plurality of unicast control flows are received at a network element from a plurality of clients. One of the unicast control flows is forwarded to a server. A unicast content flow is received from the server at the network element in response to forwarding the one of the unicast control flows. The unicast content flow is replicated at the network element as a plurality of replicated unicast content flows for transmission to the plurality of clients.

24 Claims, 15 Drawing Sheets

U.S. PATENT DOCUMENTS

| | | | |
|---|---|---|---|
| 6,741,595 | B2 | 5/2004 | Maher et al. |
| 6,779,030 | B1 | 8/2004 | Dugan et al. |
| 6,789,116 | B1 | 9/2004 | Sarkissian et al. |
| 6,873,600 | B1 | 3/2005 | Duffield et al. |
| 6,920,109 | B2 | 7/2005 | Yazaki et al. |
| 6,948,003 | B1 | 9/2005 | Newman et al. |
| 6,961,539 | B2 | 11/2005 | Schweinhart et al. |
| 6,976,090 | B2* | 12/2005 | Ben-Shaul et al. ........... 709/246 |
| 6,985,431 | B1 | 1/2006 | Bass et al. |
| 7,002,977 | B1 | 2/2006 | Jogalekar |
| 7,136,359 | B1* | 11/2006 | Coile et al. ................. 370/248 |
| 7,161,897 | B1* | 1/2007 | Davies et al. ............... 370/217 |
| 7,243,136 | B2* | 7/2007 | Huston et al. ............... 709/217 |
| 7,257,616 | B2 | 8/2007 | Bass et al. |
| 7,269,835 | B2* | 9/2007 | Swix et al. .................... 725/23 |
| 7,272,115 | B2 | 9/2007 | Maher, III et al. |
| 7,305,473 | B2* | 12/2007 | Vogt ........................... 709/227 |
| 7,318,100 | B2* | 1/2008 | Demmer et al. ............ 709/229 |
| 7,328,449 | B1* | 2/2008 | Park et al. ..................... 725/40 |
| 7,349,921 | B2* | 3/2008 | Hirstius et al. ........... 707/104.1 |
| 7,376,731 | B2 | 5/2008 | Khan et al. |
| 7,376,953 | B2* | 5/2008 | Togasaki ..................... 718/105 |
| 7,420,917 | B2 | 9/2008 | Ishikawa et al. |
| 7,451,176 | B2* | 11/2008 | Anders et al. ............... 709/201 |
| 7,453,804 | B1 | 11/2008 | Feroz et al. |
| 7,492,713 | B1 | 2/2009 | Turner et al. |
| 7,496,661 | B1 | 2/2009 | Morford et al. |
| 7,508,764 | B2 | 3/2009 | Back et al. |
| 7,558,261 | B2* | 7/2009 | Arregoces et al. ........... 370/389 |
| 7,602,775 | B1* | 10/2009 | Ke et al. ..................... 370/386 |
| 7,606,147 | B2 | 10/2009 | Luft et al. |
| 7,664,879 | B2* | 2/2010 | Chan et al. .................. 709/245 |
| 2002/0016860 | A1 | 2/2002 | Garcia-Luna-Aceves et al. |
| 2002/0036983 | A1 | 3/2002 | Widegren et al. |
| 2002/0107908 | A1 | 8/2002 | Dharanikota |
| 2002/0116521 | A1 | 8/2002 | Paul et al. |
| 2002/0122422 | A1 | 9/2002 | Kenney et al. |
| 2002/0122424 | A1 | 9/2002 | Kawarai et al. |
| 2002/0181462 | A1 | 12/2002 | Surdila et al. |
| 2003/0005112 | A1 | 1/2003 | Krautkremer |
| 2003/0005455 | A1* | 1/2003 | Bowers ........................ 725/90 |
| 2003/0067903 | A1 | 4/2003 | Jorgensen |
| 2003/0081546 | A1 | 5/2003 | Agrawal et al. |
| 2003/0108015 | A1 | 6/2003 | Li |
| 2003/0118029 | A1 | 6/2003 | Maher et al. |
| 2003/0126230 | A1* | 7/2003 | Donatelli et al. ............ 709/217 |
| 2003/0235209 | A1 | 12/2003 | Garg et al. |
| 2004/0013089 | A1 | 1/2004 | Taneja et al. |
| 2004/0028051 | A1 | 2/2004 | Etemadi et al. |
| 2004/0111461 | A1 | 6/2004 | Claudatos et al. |
| 2004/0128694 | A1* | 7/2004 | Bantz et al. ................... 725/95 |
| 2004/0248583 | A1 | 12/2004 | Satt et al. |
| 2005/0036512 | A1 | 2/2005 | Loukianov |
| 2005/0041584 | A1 | 2/2005 | Lau et al. |
| 2005/0068722 | A1 | 3/2005 | Wei |
| 2005/0100000 | A1 | 5/2005 | Faulkner et al. |
| 2006/0028982 | A1 | 2/2006 | Wright |
| 2006/0031559 | A1* | 2/2006 | Sorokopud et al. .......... 709/232 |
| 2006/0072451 | A1 | 4/2006 | Ross |
| 2006/0101159 | A1 | 5/2006 | Yeh et al. |
| 2006/0114832 | A1 | 6/2006 | Hamilton et al. |
| 2006/0140119 | A1 | 6/2006 | Yeh et al. |
| 2006/0140128 | A1 | 6/2006 | Chi et al. |
| 2006/0149841 | A1 | 7/2006 | Strub |
| 2006/0167975 | A1* | 7/2006 | Chan et al. .................. 709/203 |
| 2006/0233101 | A1 | 10/2006 | Luft et al. |
| 2007/0061433 | A1 | 3/2007 | Reynolds et al. |
| 2007/0162927 | A1* | 7/2007 | Ramaswamy et al. ......... 725/36 |
| 2009/0262741 | A1* | 10/2009 | Jungck et al. ............... 370/392 |

FOREIGN PATENT DOCUMENTS

| | | |
|---|---|---|
| CA | 2 276 526 A1 | 7/1998 |
| CA | 2 511 997 A1 | 8/2004 |
| EP | 1093266 A2 | 4/2001 |
| WO | WO 99/30460 | 6/1999 |
| WO | WO 03/094449 A1 | 11/2003 |
| WO | WO2005/017707 A2 | 2/2005 |

OTHER PUBLICATIONS

PCT/CA2006/001423, PCT International Search Report and Written Opinion, Dec. 18, 2006.

PCT/CA2006/001469, PCT International Search Report and Written Opinion, Dec. 28, 2006.

"Delivering Video over IP," Microsoft Corporation, 2003.

"What Is Unicast IPv4 Routing?" Microsoft TechNet, Microsoft Corporation, Mar. 28, 2003, pp. 1-6.

"How IPv4 Multicasting Works," Microsoft TechNet, Microsoft Corporation, Mar. 28, 2003, pp. 1-32.

"How Unicast IPv4 Routing Protocols and Services Work," Microsoft TechNet, Microsoft Corporation, Mar. 28, 2003, pp. 1-60.

U.S. Appl. No. 11/106,172, filed on Apr. 13, 2005.

U.S. Appl. No. 11/106,163, filed on Apr. 13, 2005.

U.S. Appl. No. 11/224,275, filed on Sep. 12, 2005.

U.S. Appl. No. 11/224,201, filed on Sep. 12, 2005.

PCT/CA2006/000555, PCT International Search Report and Written Opinion of the International Searching Authority, Jul. 26, 2006.

PCT/CA2006/000554, PCT International Search Report and Written Opinion of the International Searching Authority, Aug. 1, 2006.

Bodin, U., et al., "End-to-End QoS control architectures from a wholesale and retail perspective: benefits and challenges." [retrieved Apr. 19, 2007]. Retrieved from the Internet: www.operax.com. Operax, Tegeluddsvägen 92, SE-115 28, Stockholm, Sweden.

Gallon, C., et al., MSF Technical Report, MSF-TR-ARCH-005-FINAL. "Bandwidth Management in Next Generation Packet Networks." MultiService Forum. Aug. 2005.

Jungck, Peder, "Open Network Services Platforms for High-Value Network Services", [online], 2004 [retrieved Feb. 28, 2007]. Retrived from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." Sep. 2005. [retrieved Feb. 28, 2007]. Retrieved from the Internet: www.operax.com. Operax, Tegeluddsvägen 92, SE-115 28, Stockholm, Sweden.

"CloudShield Content Control Suite: Modular Software for Implementing Multi-Function Service Control." 2006. [retrieved Feb. 28, 2007]. Retrieved from the Internet: CloudShield Technologies, Inc., www.cloudshield.com. CloudShield, 212 Gibraltar Drive, Sunnyvale, California 94089.

"CloudShield Network Observatory: CS-2000 with $3^{rd}$ Party Applications Bring Network Content Into Focus." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CloudShield PacketWorks IDE: Developers' Toolkit for CS-2000 In-Network Computing Platform." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CS-2000 Content Processing Platform: Multi-Function Systems for Controlling and Securing Next Generation Services." 2006. [retrieved Feb. 28, 2007]. Retrieved from the Internet: CloudShield Technologies, Inc., www.cloudshield.com. CloudShield, 212 Gibraltar Drive, Sunnyvale, California 94089.

"Efficient Network Resource Control—A Source of Competitive Advantage." Sep. 2005. Operax, Tegeluddsvägen 92, SE-115 28, Stockholm, Sweden.

"Ellacoya Introduces VoIP Quality Reporter (VQR)." [online] Ellacoya Networks, Inc., 2007. [retrieved Apr. 19, 2007] Retrieved from the Internet: <URL: http://www.ellacoya.com/products/vqr.shtml>.

"Ellacoya Multimedia Service Manager (MSM) PacketCable Multimedia-based Application." [online] Ellacoya Networks, Inc., 2007. [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., 2007. [retrieved Apr. 19, 2007] Retrieved from the Internet: <URL: http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"IMS and Operax Bandwidth Manager—Guaranteed QoS." [retrieved Apr. 19, 2007]. 2006. Retrieved from the Internet: www.operax.com. Operax, Tegeluddsvägen 92, SE-115 28, Stockholm, Sweden.

"Integrating Applications with the CloudShield ONSP." Aug. 2004. CloudShield Technologies, Inc., www.cloudshiled.com. CloudShield, 212 Gibraltar Drive, Sunnyvale, California 94089.

"Integrated Content Control for An All IP World." [retrieved Feb. 28, 2007]. Retrieved from the Internet: CloudShield Technologies, Inc., www.cloudshiled.com. CloudShield, 212 Gibraltar Drive, Sunnyvale, California 94089.

"IP Service Control System." 2005. [retrieved Apr. 19, 2007] Retrieved from the Internet: Ellacoya Networks, Inc., www.ellacoya.com. Ellacoya Networks, 7 Henry Clay Drive, Merrimack, NH 03054 USA.

"Managed DDoS Security Services: An Arbor Networks/CloudShield Solution." Aug. 2004. CloudShield Technologies, Inc., www.cloudshield.com. CloudShield, 212 Gibraltar Drive, Sunnyvale, California 94089.

"Meeting the Multi-Service IP QoS Challenges." 2005. [retrieved Apr. 19, 2007]. Retrieved from the Internet: www.operax.com. Operax, Tegeluddsvägen 92, SE-115 28, Stockholm, Sweden.

"On the Road to IP Multi-Service." 2005. [retrieved Apr. 19, 2007]. Retrieved from the Internet: www.operax.com. Operax, Tegeluddsvägen 92, SE-115 28, Stockholm, Sweden.

"Operax Bandwidth Manager 5500: QoS control for the access, aggregation and edge." 2006. [retrieved Apr. 19, 2007]. Retrieved from the Internet: www.operax.com. Operax, Tegeluddsvägen 92, SE-115 28, Stockholm, Sweden.

"Operax Bandwidth Manager 5700: QoS control for IP/MPLS Networks." 2006. [retrieved Apr. 19, 2007]. Retrieved from the Internet: www.operax.com. Operax, Tegeluddsvägen 92, SE-115 28, Stockholm, Sweden.

"Operax guarantees QoS for Video Telephony: QoS guaranteed value added services." 2005. [retrieved Apr. 19, 2007]. Retrieved from the Internet: www.operax.com. Operax, Tegeluddsvägen 92, SE-115 28, Stockholm, Sweden.

"Operax in IP Multimedia Subsystem (IMS): Advanced QoS control for IMS/NGN." 2006. [retrieved Apr. 19, 2007]. Retrieved from the Internet: www.operax.com. Operax, Tegeluddsvägen 92, SE-115 28, Stockholm, Sweden.

"Operax Triple Play: Service Control System." 2005. [retrieved Apr. 19, 2007]. Retrieved from the Internet: www.operax.com. Operax, Tegeluddsvägen 92, SE-115 28, Stockholm, Sweden.

"Prolexic DNS Shield on CS-2000: Prolexic and CloudShield Integrated Solution for DNS Service Protection." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"A Unified Policy Management Framework: IP Service Creation and Assurance in Converged Networks." Nov. 2006. Operax, Tegeluddsvägen 92, SE-115 28, Stockholm, Sweden.

* cited by examiner

APPLICATION DRIVEN FAST UNICAST FLOW REPLICATION

CROSS-REFERENCE TO RELATED APPLICATIONS

This application claims priority benefit, under 35 U.S.C. §119(e), of U.S. Provisional Application No. 60/719,890, filed on Sep. 9, 2005, the contents of which are incorporated herein by reference.

TECHNICAL FIELD

This disclosure relates generally to network packet processing, and in particular but not exclusively, relates to unicast flow replication.

BACKGROUND INFORMATION

A data packet (also known as a "packet") is a block of user data with address and administration information attached, usually in a packet header and/or footer, which allows a network to deliver the data packet to the correct destination. Examples of data packets include, but are not limited to, Internet Protocol ("IP") packets, asynchronous transfer mode ("ATM") cells, Ethernet frames, synchronous optical network ("SONET") frames, and Frame Relay packets. Typically, related data packets having similar characteristics (e.g., related to the same application) and common source and destination addresses are referred to as a packet flow.

FIG. 1 represents the Open Systems Interconnect ("OSI") model of a layered network protocol stack 100 for transmitting data packets. Each layer installs its own header in the data packet being transmitted to control the packet through the network. A physical layer (layer 1) 105 is used for the physical signaling. A next layer, data link layer (layer 2) 110, enables transferring of data between network entities. A network layer (layer 3) 115 contains information for transferring variable length data packet between one or more networks. For example, IP addresses are contained in network layer 115, which allows network devices (also commonly referred to a network elements) to route the data packet. Layer 4, transport layer 120, provides transparent data transfer between end users. A session layer (layer 5) 125, provides the mechanism for managing the dialogue between end-user applications. A presentation layer (layer 6) 130 provides independence from difference in data representation (e.g. encryption, data encoding, etc.). The final layer is an application layer (layer 7) 135, which contains the actual data used by the application sending or receiving the packet. While protocol stacks often do not exactly follow the OSI model, it is commonly used to describe networks.

FIG. 2 illustrates a typical client-server model where a plurality of client subscribers 205 receive and consume content transmitted by a content provider 210 (the server) transported via a network 215 (e.g., the Internet, a wide area network, a metro network, a local area network, or the like). Network 215 may include one or more routers 220 to switch packets carrying the content through network 215 in packet flows.

The predominant form of transmission on local area networks ("LANs"), wide area networks ("WANs"), and within the Internet is unicast transmission. Unicast is the term used to describe communication where a piece of information is sent from one point to another. In other words, there is just one sender and just one receiver. A unicast packet is a packet that has been transmitted from a single source and is addressed to a single destination. Unicast packets using the IPv4 or IPv6 standard, have specified header/footer fields set, which identify the packets as unicast packets. A flow of related unicast packets is referred to as a unicast flow. The term unicast exists in contradiction to multicast, which is communication between a single sender and multiple receivers, and anycast, which is communication between any sender and the nearest of a group of receivers in a network. Unicast packets are distinct from multicast and anycast packets not only in the techniques used to route them through a network, but also in the values and fields set in their packet headers/footers.

Accordingly, FIG. 2 illustrates content provider 210 transmitting independent and distinct unicast content flows to each client subscriber 205. A unicast content flow is simply a unicast flow of data packets which provides content (e.g., media content, video on demand ("VoD"), IP television ("IPTV"), streaming audio, etc.) for consumption by client subscribers 205. Client subscribers 205 may communicate back to the content provider 210 (e.g., to select the particular content desired) with control packets transmitted in unicast control flows.

Since conventional routers are limited to layer-3 processing, which include the IP address processing to make routing decisions, router 220 is labeled as an L3 router. FIG. 3 illustrates the layered network protocol stacks associated with each network element in FIG. 2. Client subscribers 205 execute protocol stacks 305 on the client side, content provider 210 executes a protocol stack 310 on the server side, and L3 router 220 executes a protocol stack 320.

Protocol stacks 305 and 310 terminate the unicast flows, since they are the ultimate source or destination of the unicast flows. In other words, the server application executing on content provider 210 and the client applications executing on client subscribers 205 parse data communicated in the unicast flows all the way to the application layer to extract the specific application data. In the case of unicast control flows 325, this is illustrated with termination dots 330. In contrast, unicast control flow 325 is merely parsed up to the network layer in L3 router 220. L3 router 220 only unwraps or analyzes the packets of unicast control flows 325 to the network layer to effect routing decision, but is unaware of higher layer data and therefore unable to interpret application data wrapped in the application layer. L3 router 220 does not access the application data and therefore does not terminate unicast control flows 325. Similarly, unicast content flows 335 pass through L3 router 220 without termination and without the application data being parsed or analyzed.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a method, apparatus, and system for unicast flow replication are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to ("one embodiment" or ("an embodiment" means that a particular feature, structure, or characteristic described in connection with the embodiment is included in at least one embodiment of the present invention. Thus, the appearances of the phrases ("in one embodiment" or ("in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A ("unicast flow" is defined herein as a plurality of related packets, cells, or frames flowing into or out of a network node and having a common source/destination address pair. A unicast flow is distinct from a multicast flow in that a unicast flow is addressed to a single destination, whereas a multicast flow is not address to a single destination. Furthermore, unicast and multicast techniques use different protocols and set different header/footer fields, as is known in the art of network communications.

Figure 4:
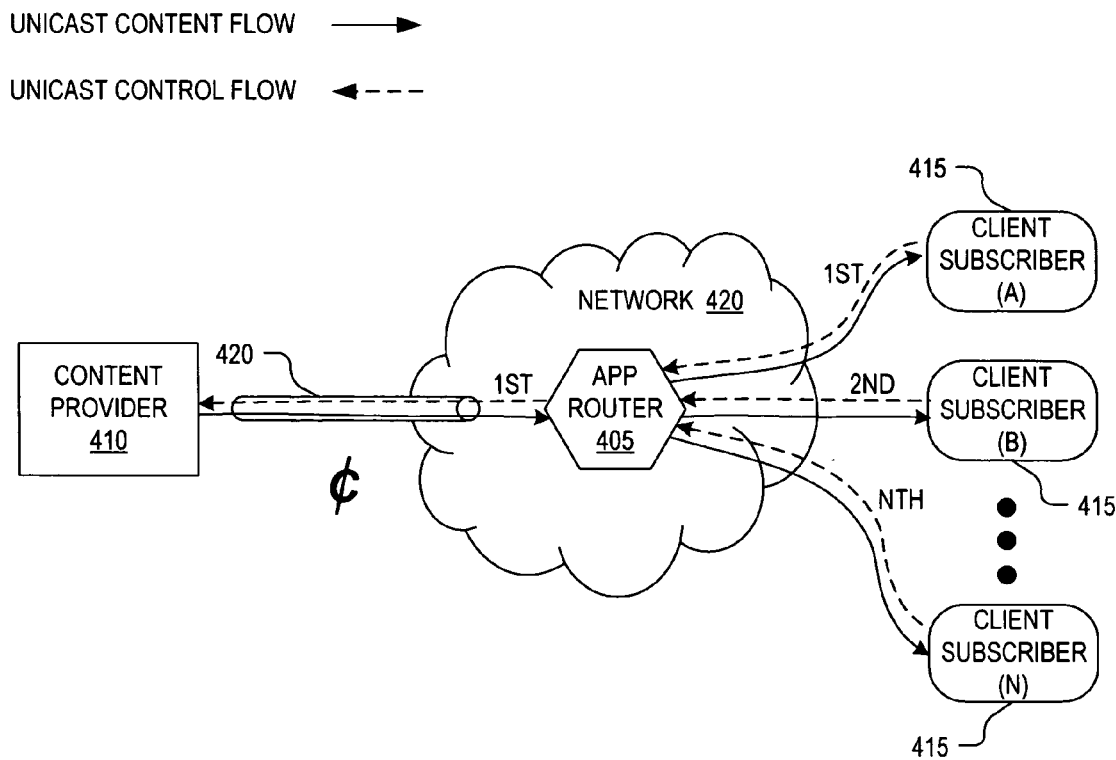
FIG. 4 is a block diagram illustrating unicast flow replication by an application router, in accordance with an embodiment of the invention.

FIG. 4 is a block diagram illustrating a system 400 for unicast flow replication using an application ("APP") router 405, in accordance with an embodiment of the invention. The illustrated embodiment of system 400 includes APP router 405, a content provider 410, client subscribers A, B, to N (collectively client subscribers 415), and a network 420.

APP router 405 acts to terminate and replicate unicast flows transmitted between client subscribers 415 and content provider 410, thereby reducing bandwidth consumption along link 420 between APP router 405 and content provider 410. In one embodiment, APP router 405 includes sufficient line rate processing power and intelligence to intercept unicast flows traversing its datapaths, analyze or decode them all the way to the application layer, interpret the application data contained therein to determine whether two or more unicast control flows are redundant (i.e., requesting similar content), and terminate redundant unicast requests for the same content. When redundant unicast requests for the same content are received, APP router 405 forwards one unicast request for the content on to content provider 410, terminates and queues subsequent redundant unicast requests, and then replicates the unicast content flows to all client subscribes 415 that have requested the same unicast content.

Figure 1:
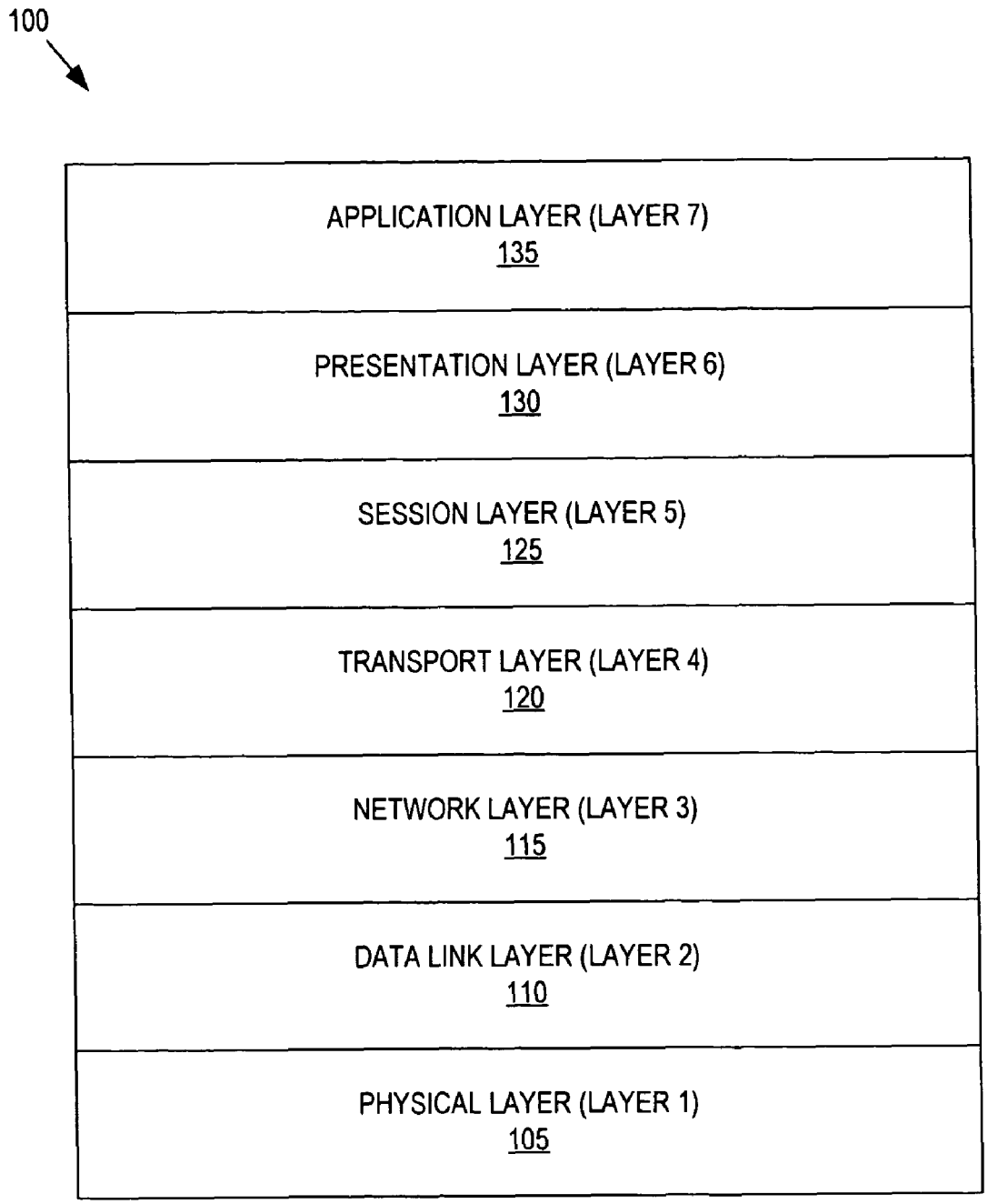
FIG. 1 (Prior Art) is a block diagram illustrating the Open Systems Interconnect model of a layered network protocol stack.
Figure 2:
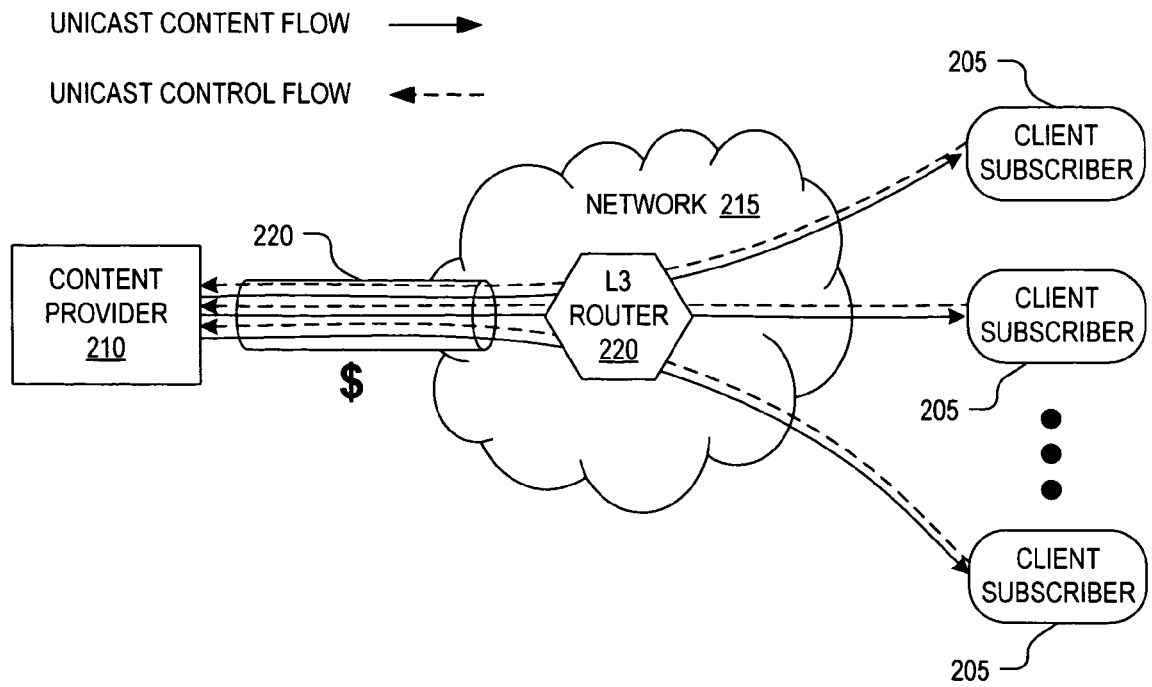
FIG. 2 (Prior Art) is a block diagram illustrating unicast flows between a server and multiple clients via a layer-3 router.
Figure 3:
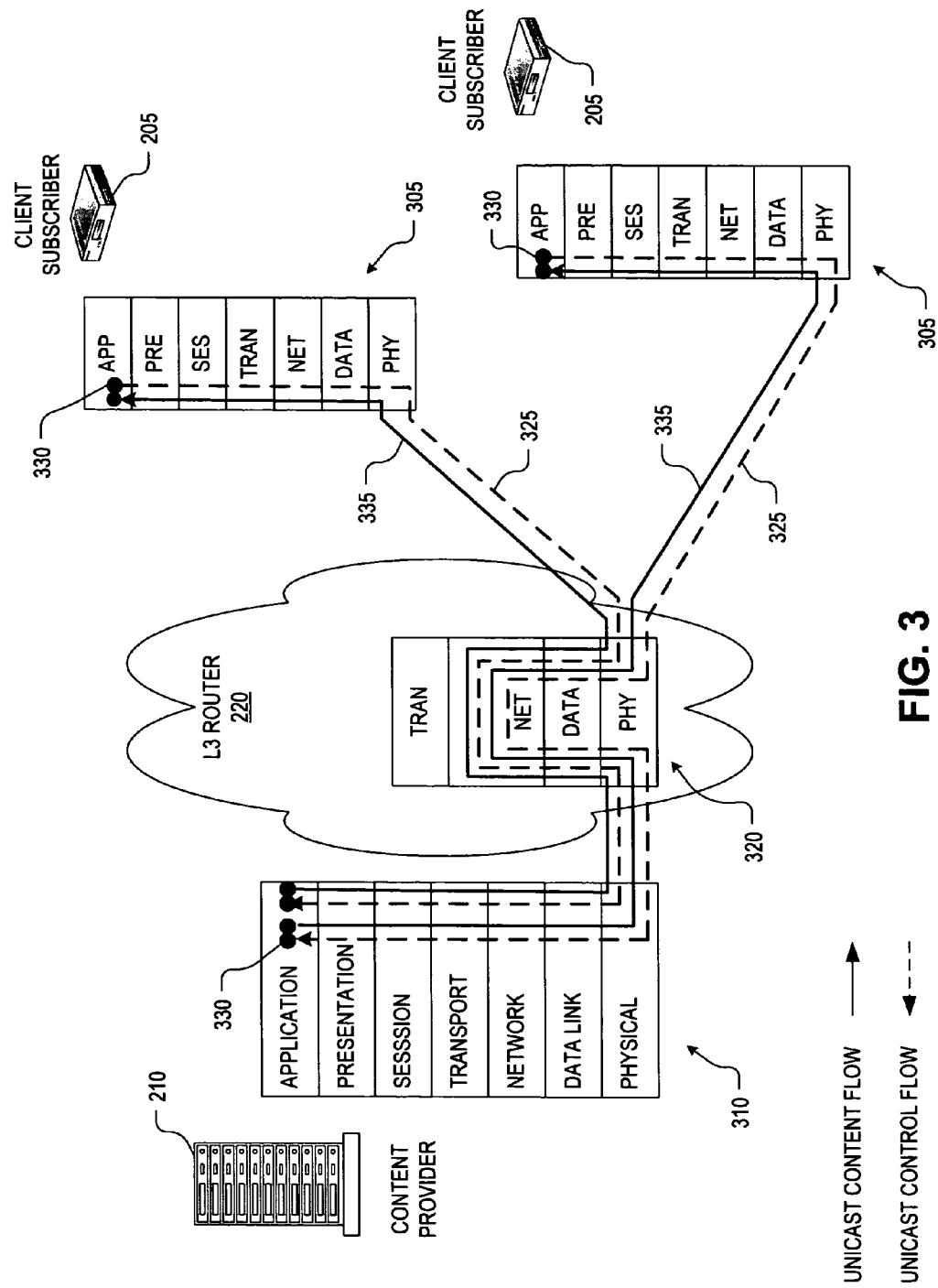
FIG. 3 (Prior Art) is a block diagram illustrating network protocol stacks executed by a server, multiple clients, and a layer-3 router.

When compared to the functionality provided by L3 router 220 illustrated in FIG. 2, L3 router 220 simply and blindly routes all unicast content and control flows between content provider 210 and client subscribers 205, without regard as to whether it is forwarding redundant unicast requests and content. While content provider 210 must lease sufficient bandwidth along link 220 at potentially considerable cost, content provider 410 can lease substantially lower bandwidth along link 420 at potentially significant cost savings, and rely on network 420 (and APP router 405) to manage replication of redundant unicast flows to client subscribers 415. Not only do the techniques described herein equate to potential costs savings for content provider 410, but they also transfer the technical burden of high volume content delivery onto network administrates away from content provider 410 who's expertise are in generating the content—not delivering the content to paying subscribers. The unicast replication techniques described herein are applicable to any unicast traffic, but are particularly useful for broadcast content, such as, multimedia content (e.g., streaming audio or video), video-on-demand ("VoD"), web TV or IPTV (e.g., Microsoft IPTV branded service), or the like. For example, content provider 410 may represent a news wire service (e.g., Reuters), which streams text, audio, photographs, and video of current events happening in real-time around the world.

Figure 5:
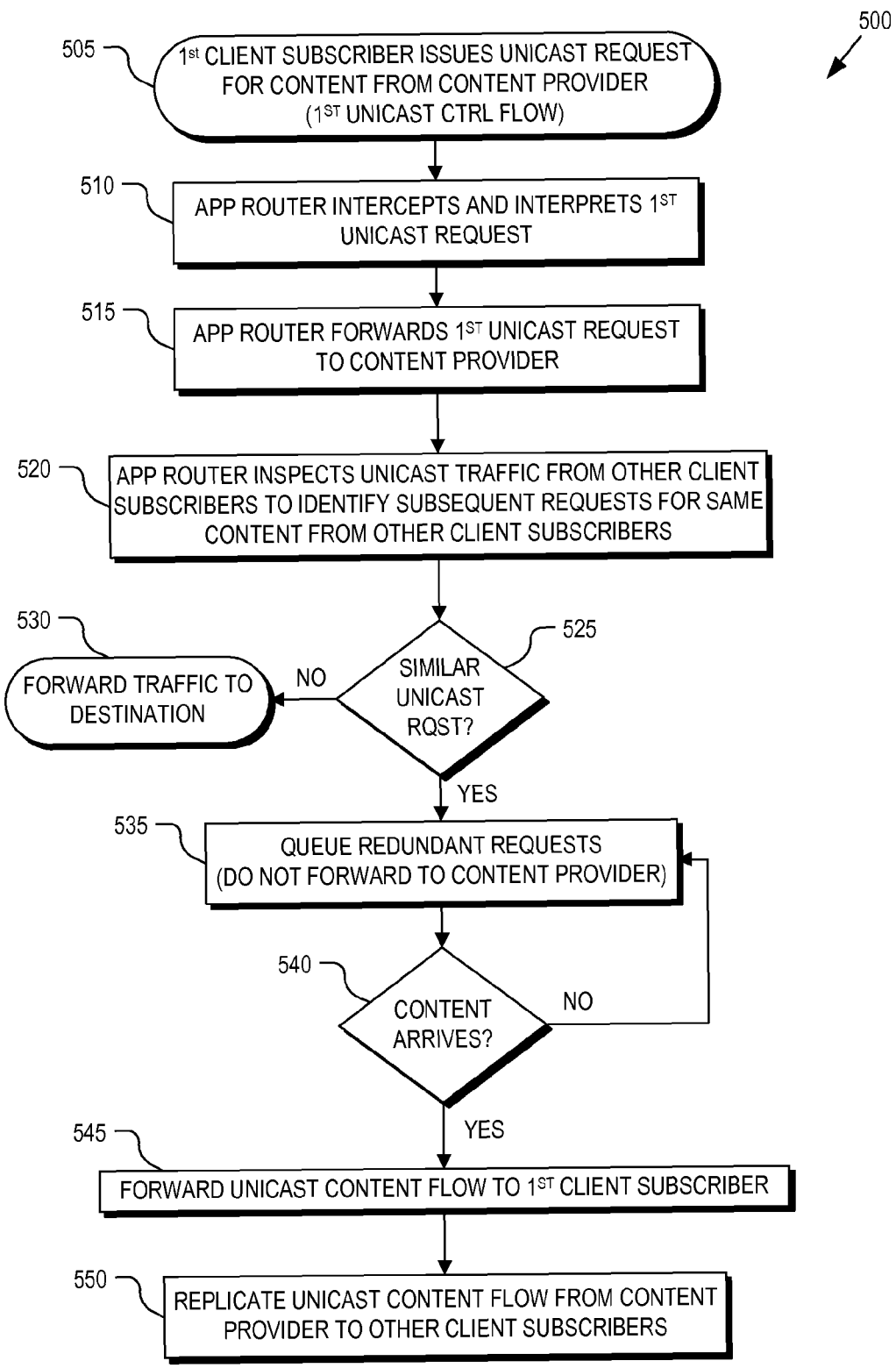
FIG. 5 is a flow chart illustrating a process for unicast flow replication by an application router, in accordance with an embodiment of the invention.

FIG. 5 is a flow chart illustrating a process 500 for unicast flow replication by APP router 405, in accordance with an embodiment of the invention. Process 500 is described with reference to FIG. 4. The order in which some or all of the process blocks appear in each process should not be deemed limiting. Rather, one of ordinary skill in the art having the benefit of the present disclosure will understand that some of the process blocks may be executed in a variety of orders not illustrated.

In a process block 505, one of client subscribers 415 (e.g., client subscriber A) is the first to issue a unicast request for content from content provider 410. A unicast request may be transmitted in a unicast control flow which transports application specific control data from a client application on client subscriber A to content provider 410. Since the request is transmitted using unicast protocols, the packets making up the unicast flow include specific source/destination addresses. The source address will identifying client subscriber A. The destination address will depend upon whether APP router 405 is operating as a ("transparent intermediary" or an ("apparent intermediary". In a transparent intermediary embodiment, the destination address of the unicast request may designate content provider 410. In an apparent intermediary embodiment, the destination address may designate APP router 405, itself.

In a process 510, APP router 405 receives the $1^{st}$ unicast control flow containing the $1^{st}$ unicast request. Upon receiving the $1^{st}$ unicast control flow, APP router 405 inspects the packets of the unicast control flow to identify the application from which they were generated and interpret the data to determine context of the request. APP router 405 may then buffer or store this information to identify redundant unicast requests originating from different client subscribers 415 executing the same application to render unicast replication decisions. In the transparent intermediary embodiment, APP router 405 may use deep packet inspection to identify specific unicast control flows. In the apparent intermediary embodiment, a version of the application executing on client subscribers 415 may be embedded in and executing on APP router 405. In one embodiment, this embedded application may mimic the server-side application executing on content provider 410 to client subscribers 415, while appearing as a client-side application to content provider 410.

In a process block 515, APP router 405 forwards the $1^{st}$ unicast request to content provider 410 using standard unicast routing protocols. In one embodiment, APP router 405 terminates the $1^{st}$ unicast control flow and generates a new unicast control flow with a destination address identifying content provider 410 but a source addresses identifying APP router 405 itself. In this manner, when the associated unicast content flow returns, it goes directly to APP router 405, which can then terminate the unicast content flow and generate a new unicast content flow destined for client subscriber A. In an alternative embodiment, APP router 405 does not change the original source/destination address of the $1^{st}$ unicast control flow, but rather monitors link 420 to identify the response unicast content flow from content provider 410.

In a process block 520, APP router 405 monitors unicast traffic received from the other client subscribers B to N to identify subsequent unicast requests for the identical content from content provider 410. In one embodiment, APP router 405 identifies identical unicast requests from other client subscribers by parsing unicast packets up to the application layer to identify the originating application and interpret the application data to identify identical requests (decision block 525). If a subsequent unicast flows received from client subscribers 415 contain unique or different requests than the $1^{st}$ unicast request, then the unicast traffic is routed to its destination in a process block 530. However, if a redundant unicast request is identified, then process 500 continues to a process block 535.

In process block 535, the redundant unicast requests are queued and a list of client subscribers 415 requesting the same content generated. It is noteworthy that the redundant unicast requests are queued rather than forwarded on to content provider 410. In this manner, link 420 is spared the bandwidth consumption associated with redundant unicast control flow requests arriving at APP router 405 during a finite window of time. If the unicast content being streamed from content provider 410 is being synchronously delivered to a large number of client subscribers (e.g., IPTV, VoD, streaming radio broadcasts, etc.), then the number of redundant unicast requests arriving at APP router 405 during the finite window of time may be relatively large. In one embodiment, the finite window of time is equal to the period of time it takes between the arrival of the $1^{st}$ unicast control flow requesting specific content and the arrival of the requested content from content provider 410 at APP router 405 in a unicast content flow. In a scenario where the session of a unicast content flow is long lived, APP router 405 may enroll or join new client subscribers 415 at any time.

When the requested content arrives from content provider 410 in a unicast content flow (decision block 540), process 500 continues to a process block 545. In process block 545, the unicast content flow is forwarded to the client subscriber 415 which first requested the content (e.g., client subscriber A). As mentioned above, in one embodiment the $1^{st}$ unicast control flow may be terminated and a new unicast control flow generated with a source addressed identifying APP router 405 prior to forwarding the new unicast control flow to content provider 410. In this embodiment, since content provider 410 would consider APP router 405 as the destination (or the client), APP router 405 terminates the return unicast content flow and creates a new unicast content flow with a destination address identifying the first client subscriber 415 (e.g., client subscriber A) that issued the $1^{st}$ unicast control flow. If APP router 405 is operating as an apparent intermediary to client subscriber 415, then APP router 405 would create the new unicast content flow with a source address designating APP router 405, itself.

In the transparent intermediary embodiment, APP router 405 may either substitute its own address as the source address for the $1^{st}$ unicast control flow that it forwards to content provider 410 or retain the source address of client subscriber A 415. In the former ("partially transparent" case, APP router 405 is only transparent to client subscriber A 415, but not to content provider 410. In the latter ("fully transparent" case, APP router 405 is transparent to both client subscriber A 415 and content provider 410. In the fully transparent case, APP router 405 simply inspects the application data at the application layer to identify the application and the particular content requested, then sends the unicast control flow on it way to content provider 410 undisturbed. In this fully transparent embodiment, APP router 405 monitors unicast content flows arriving from content provider 410 to identify the requested content issued in response to the unicast request. Once identified, APP router 405 can extract the requested content or application data from the response unicast content flow for replication into other unicast content flows and then forward the response unicast content flow with the source/destination addresses undisturbed to the first client subscriber A 415 that issued the $1^{st}$ unicast request.

In a process block 550, the extracted content or application data is then replicated into new unicast content flows generated by APP router 405 and each addressed to a specific client subscriber 415 that issued a redundant unicast request for the same content. As discussed above, depending upon whether APP router 405 is operating as a transparent or apparent intermediary, the source address of the replicated unicast content flows may designate either content provider 410 or APP router 405, itself.

Figure 6:
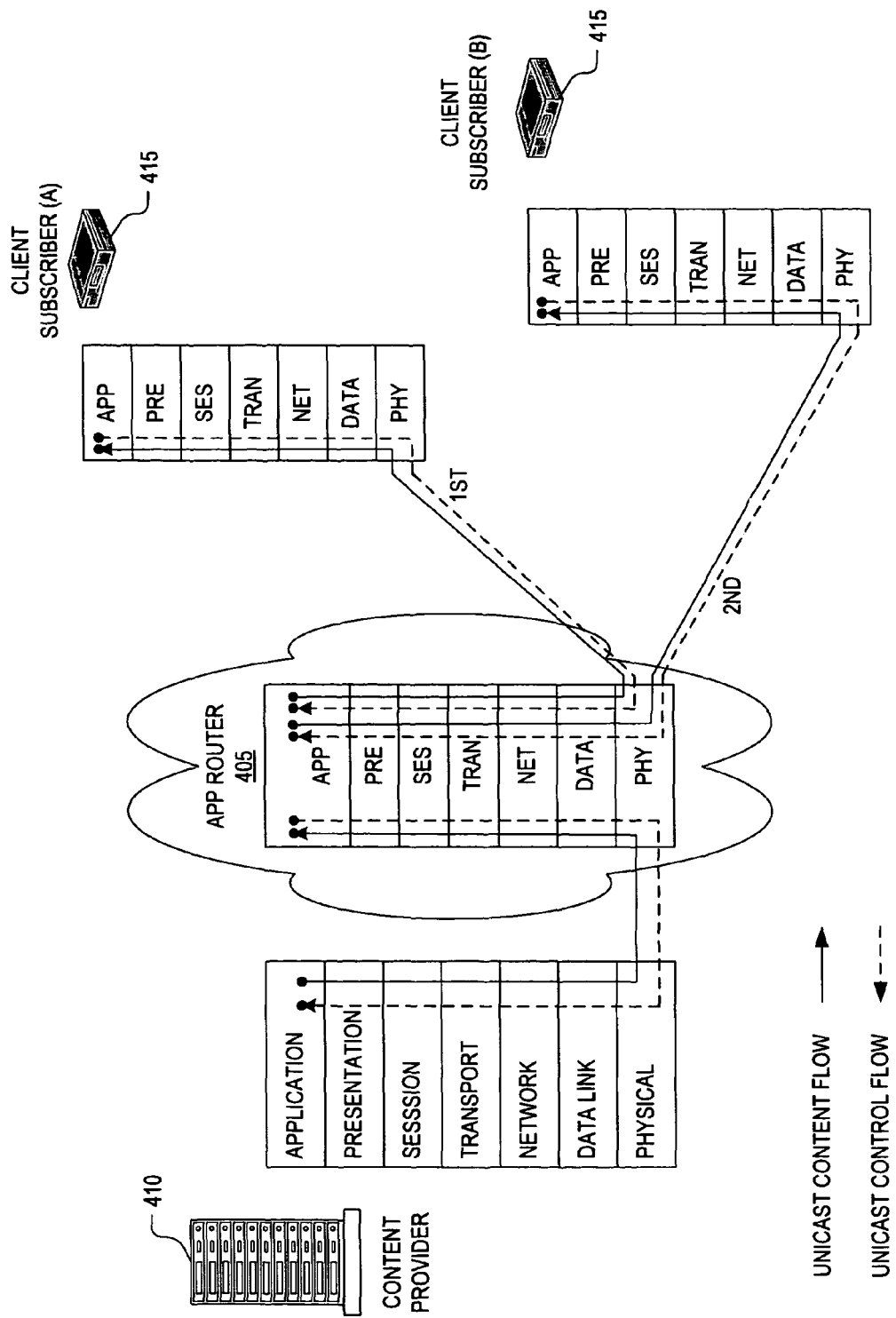
FIG. 6 is a block diagram illustrating network protocol stacks executed by a server, multiple clients, and an application router, in accordance with an embodiment of the invention.

FIG. 6 is a block diagram illustrating network protocol stacks executed by content provider 410, APP router 405, and two client subscribers 415, in accordance with an embodiment of the invention. FIG. 6 illustrates an embodiment where all unicast flows (both unicast content flows and unicast control flows) are terminated within APP router 405; however, as discussed above, in one embodiment the unicast flows associated with the 1$^{st}$ unicast request may not be terminated, but merely parsed, analyzed, and application layer data interpreted, prior to forwarding the unicast flow on to its originally addressed destination.

As illustrated, APP router 405 includes a network protocol stack that goes all the way to the application layer. In this manner APP router 405 can be said to be an application aware network element. APP router 405 is capable of parsing packets to the application layer and interpreting application layer data to make intelligent replication and forwarding decisions based on application awareness.

In the transparent intermediary embodiments, APP router 405 may perform deep packet inspection of unicast packets all the way to the application layer in real-time at line rates. This may be accomplished by bifurcating a subset of the data packets that arrive at APP router 405, making duplicate packets that are sent up to a compute plane for deep packet inspection at the application layer, while the original data packet continues along the traffic/data plane as usual. A determination of which data packets are of potential interest and therefore bifurcated, may be accomplished by a line rate 5-tuple classification executed on all packets arriving at APP router 405 along the traffic/data plane. The 5-tuple classification may be a quick technique to determine whether an arriving traffic flow is unicast traffic from a particular source address, which should be inspected in further detail at the application layer to determine whether unicast flow replication is appropriate.

In the apparent intermediary embodiments, APP router 405 may include and execute a version of the applications executing on client subscribers 415 and content provider 410. In one embodiment, this network embedded application mimics server-side functionality of content provider 410 to client subscribers 415, while mimicking client-side functionality of client subscribers 415 to content provider 410. In the apparent intermediary embodiment, APP router 405 may include a combination of general purpose compute resources to terminate the application layer unicast control protocols and protocol termination engines to facilitate layer-7 replication of content to multiple client subscribers 415.

Figure 7:
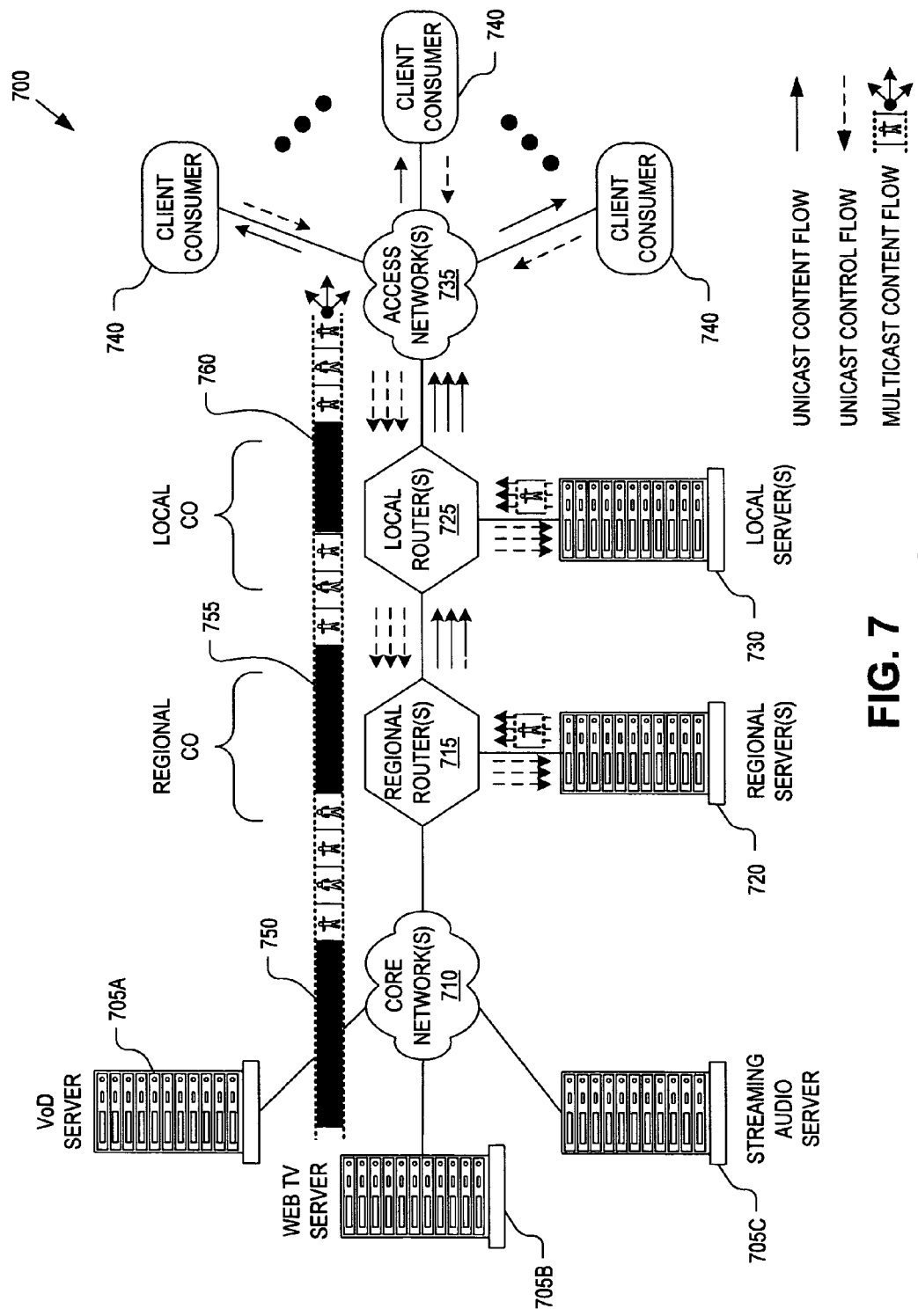
FIG. 7 (Prior Art) is a block diagram illustrating a system for delivering multicast content from a head end content server to a plurality of client consumers.

FIG. 7 is a block diagram illustrating a system 700 for delivering multicast content from a head end content server to a plurality of client consumers. The illustrated embodiment of system 700 includes one or more head end content servers 705 (e.g., VoD server 705A, web TV server 705B, streaming audio server 705C, etc. ), core network(s) 710, regional router(s) 715, regional server(s) 720, local router(s) 725, local server(s) 730, access network(s) 735, and a plurality of client consumers 740.

Regional routers 715 and regional servers 720 may be located in regional central offices ("COs"), while local routers 725 and local servers 730 may be located in local COs. Core network 710 links to the content providers to deliver content to client consumers 740 via access networks 735. Access network 735 may provide access to hundreds or thousands of client consumers 740 and aggregates the traffic therefrom.

In the case of web TV server 705B, the original IPTV content is delivered in multicast flows to client consumers 740, regional servers 720, and local servers 730. The multicast protocol enables links attached to each router along the path to join the multicast session so that only a single multicast flow is delivered to each link. The multicast protocol pushes replication to the periphery of the networks so that multicast replication occurs within access network 735 to each client consumer 740 that joins a specific multicast session (i.e., IPTV channel). It is noted that the mechanisms and packets associated with multicast are very different than those associated with unicast. Furthermore, the multicast join/depart protocol are serviced at the network or transport layers—not the application layer.

The original IPTV content may be generated with national commercial slots 750. A portion of the national commercial slots 750 may be replaced with regional commercial slots 755 inserted at insertion points provided with the original feed at the regional COs. Similarly, a portion of the national/regional commercial slots 750/755 may be replace yet again with local commercial slots 760 inserted at one or more of the insertion points at the local COs.

Figure 8A:
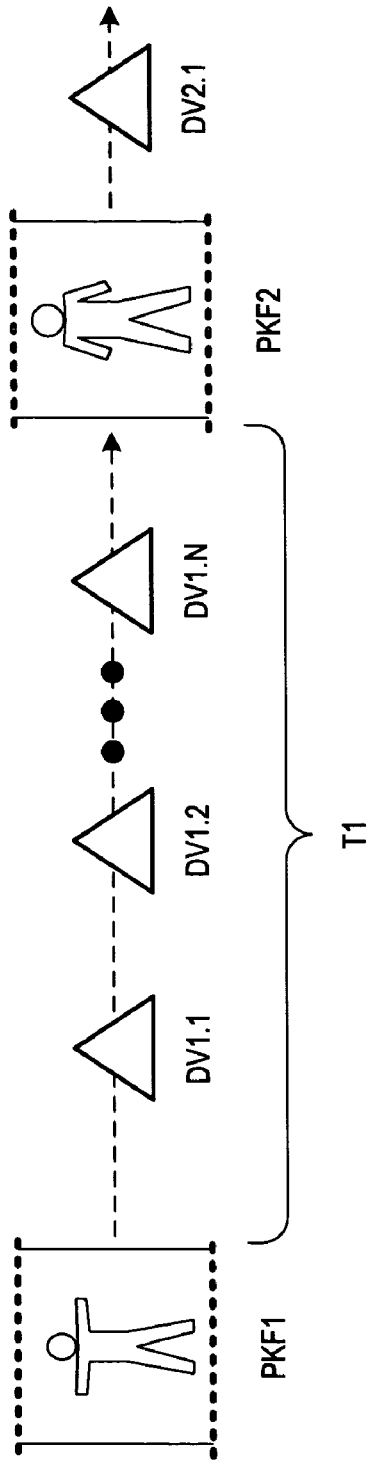
FIG. 8A (Prior Art) is a block diagram illustrating a multicast content flow including primary key frames and delta vectors for transporting Internet Protocol ("IP") television ("IPTV") content.

To efficiently and securely deliver multicast content from web TV server 705B to client consumers 740, compression and/or encryption algorithms may be applied to the multicast content flows. FIG. 8A illustrates a multicast content flow broadcasted using a compression algorithm including primary key frames ("PKFs") and intervening delta vectors ("DVs"). The PKFs include all the data to display a single frame image while the DVs include data describing changes to the previous PKF. By increasing the number of DVs transmitted between PKFs greater compression is achieved. However, increasing the number of intervening DVs, increases the time interval T1 between adjacent PKFs. In some cases, the time interval T1 may be as long as 2 sec to 15 sec to achieve acceptable bandwidth constraints for a given network and QoS.

Figure 8B:
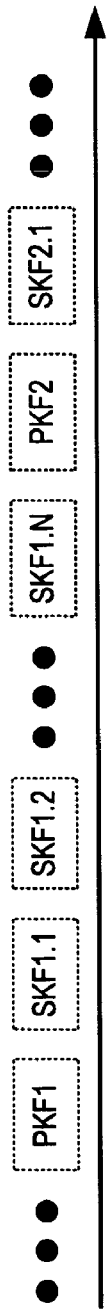
FIG. 8B (Prior Art) is a block diagram illustrating secondary key frames generated by regional or local servers to effectuate fast channel changes for an IPTV delivery system.

However, since DVs have no meaning without the immediately preceding PKF, when a client consumer changes the channel, the client consumer must wait until the next PKF arrives to display an image. If time interval T1 is long, channel changes can become slow and channel surfing nearly impossible. Accordingly, to overcome this drawback, local servers 730 and regional servers 720 may continuously generate secondary key frames ("SKF") based on the PKFs and DVs received from the head end content server (e.g., web TV server 705B). FIG. 8B illustrates the continuous generation of SKFs by regional servers 720 or local servers 730. When a client consumer 740 requests a channel change, it simply departs from the original multicast broadcast session, issues a unicast request to one of regional servers 720 or local servers 730 for a unicast burst containing a SKF for the new channel, then joins the original multicast session for the new channel. The DVs received from the head end content server are then applied to the SKF to update the image displayed by the client consumer 740 until a new PKF arrives within the multicast content flow. In this manner fast channel changes can be supported while using high compression algorithms to delivery the multicast content.

The insertion of regional and local commercials may be accomplished with this same unicast solution. When client consumers 740 receive a commercial insertion trigger along with the original multicast content flow, client consumers 740 automatically change to a local/regional commercial channel, then rejoin the original channel after consuming the local/regional commercials. To smoothly integrate the channel changes into the viewing experience, the channel changes must be quick and virtually unnoticeable by the viewer. Accordingly, the unicast burst solution for a fast channel change described above may be used.

Arrival of the commercial insertion triggers to hundreds, thousands, or even millions of client consumers 740 is a synchronous event, leading to a flash flood of unicast requests for unicast content bursts from regional servers 720 and/or local servers 730. As can be seen in FIG. 7, the unicast control flows requesting the unicast bursts from client consumers 740 are each individually routed and serviced by regional servers 720 or local servers 730, even though the unicast control flows are likely all requesting the same commercial channel change. Similarly, each regional server 720 or local server 730 responds to each redundant unicast request with an independent unicast content flow containing the burst of content requested. These synchronous commercial insertion triggers can swamp the access networks 735 or links between regional/local routers 715 or 725 and regional/local servers 720 or 730. Otherwise, system 700 and particularly networks 735 must be built-out to accommodate these high-bandwidth flash flood events.

Figure 9:
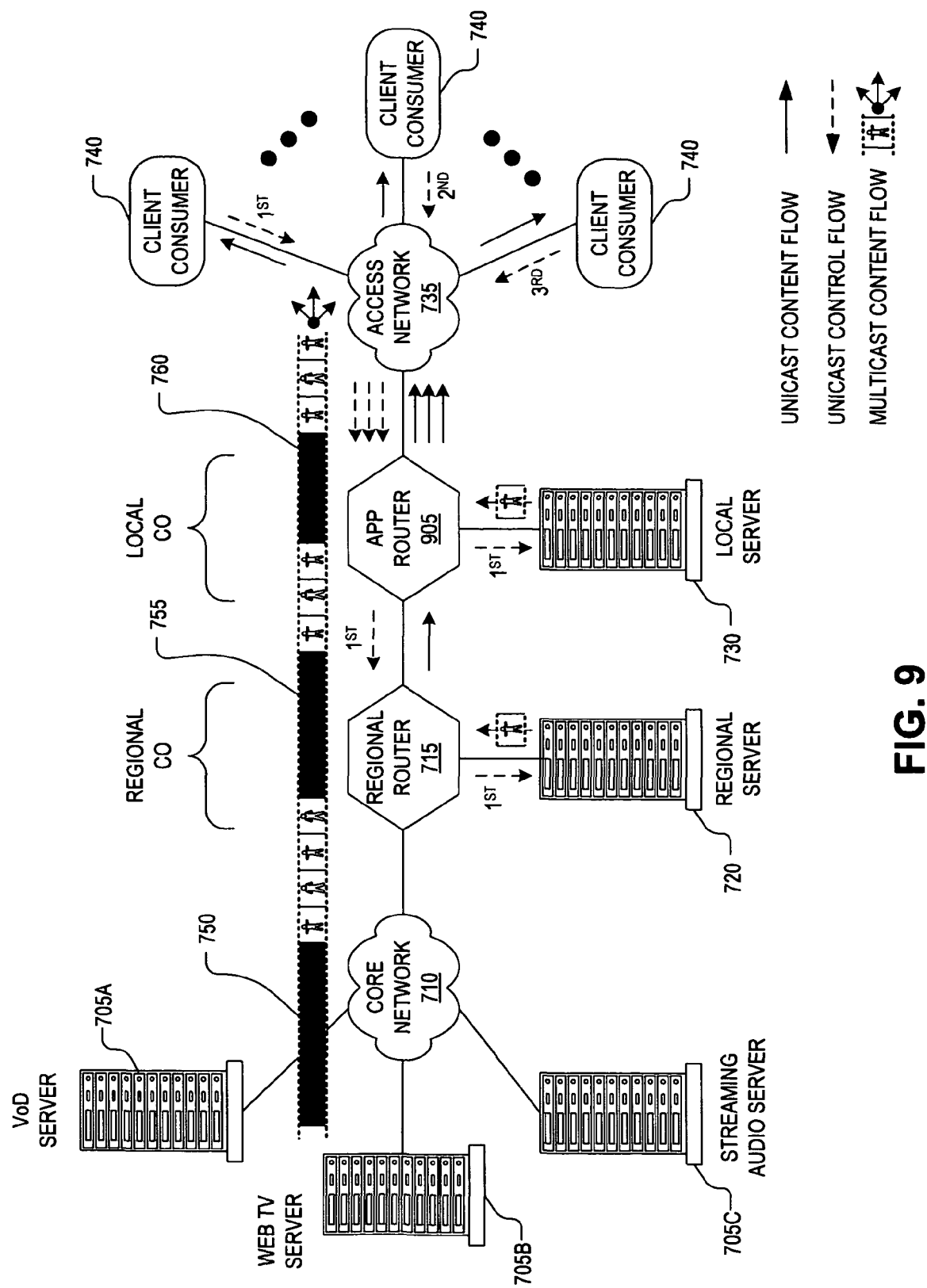
FIG. 9 is a block diagram illustrating a system for delivering multicast content from a head end content server to a plurality of client consumers using unicast flow replication between regional/local servers and the client consumers, in accordance with an embodiment of the invention.

FIG. 9 is a block diagram illustrating a system 900 supporting fast channel changes between multicast channels delivered from head end content servers 705 using unicast flow replication, in accordance with an embodiment of the invention. System 900 is similar to system 700 with the exception that local router 725 is replaced with an APP router 905. In one embodiment, both local router 725 and regional router 715 may be replaced with APP routers.

APP router 905 acts to reduce the burden of the synchronous commercial channel changes by filtering redundant unicast requests and replicating a unicast content flow to client consumers 740. APP router 905 forwards the $1^{st}$ unicast control flow request for a SKF to one of local servers 730 or regional servers 720, while filtering and queuing subsequent redundant unicast control requests for the same SKF. Regional servers 720 and local servers 730 need only respond with a single unicast content flow containing a data burst of the SKF, while APP routers 905 acts to replicate the unicast content flow to each client consumer 740. As a consequence, fewer regional servers 720 or local servers 730 are needed to service the synchronous commercial channel change events and the bandwidth requirements of the links between APP router 905 and local servers 730 or between regional router 715 and regional server 720 are reduced.

Figure 10:
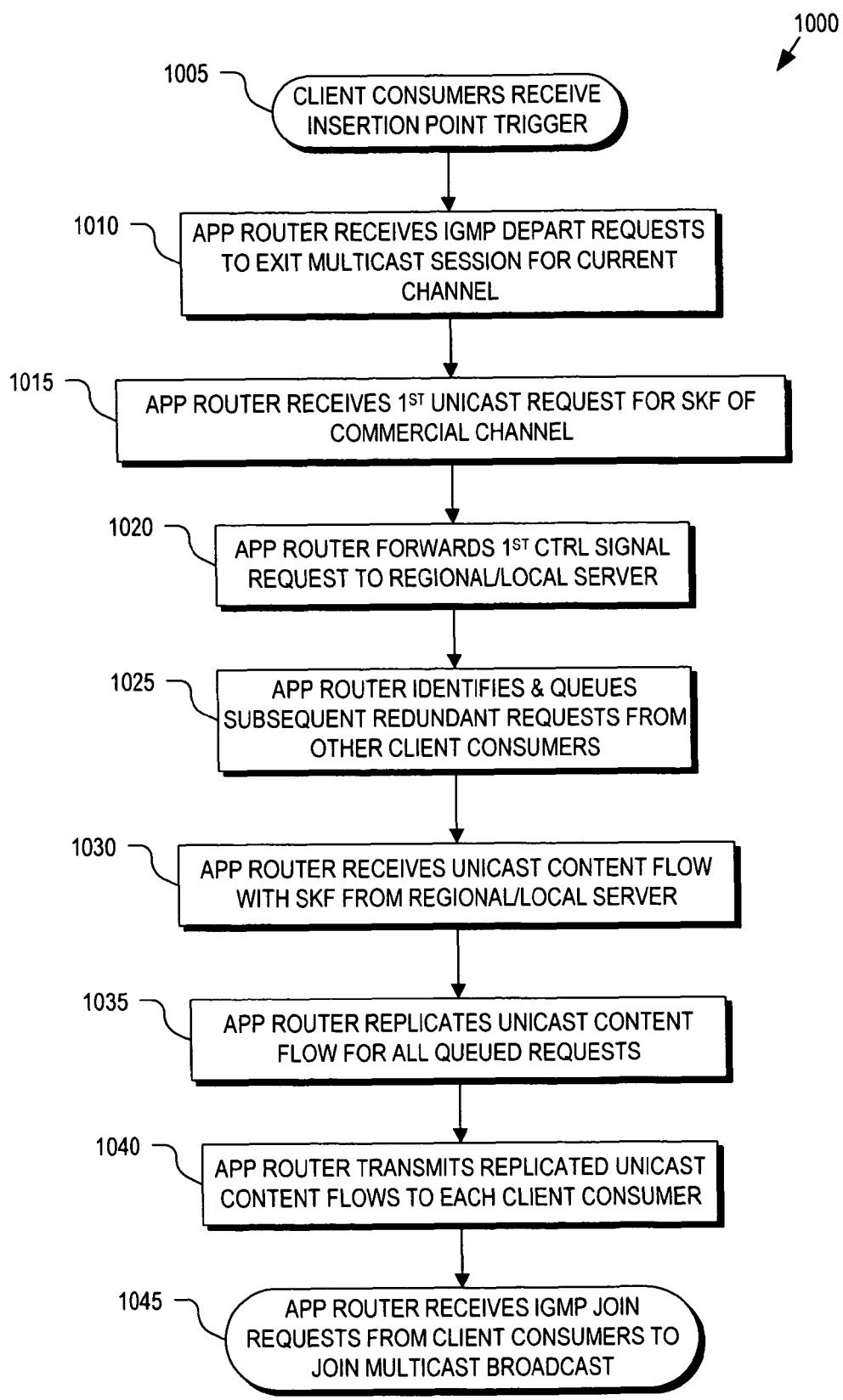
FIG. 10 is a flow chart illustrating a process for delivering multicast content from a head end content server to a plurality of client consumers using unicast flow replication between regional/local servers and the client consumers, in accordance with an embodiment of the invention.

FIG. 10 is a flow chart illustrating a process 1000 for filtering redundant unicast requests and replicating a unicast content flow to client consumers 740, in accordance with an embodiment of the invention.

In a process block 1005, client consumers 740 synchronously receive commercial insertion triggers. In a process block 1010, APP router 905 begins receiving Internet Group Management Protocol ("IGMP") depart requests from client consumers 740 to leave the current multicast channel. In a process block 1015, APP router 905 receives the $1^{st}$ unicast control flow from one of client consumers 740 requesting a unicast burst containing a SKF for the commercial channel, and then forwards the $1^{st}$ unicast control flow to one of local servers 730 or regional servers 720 (process block 1020). In one embodiment, the unicast request for the SKF is a transport layer security ("TLS") unicast request.

If APP router 905 operates as a transparent intermediary, then APP router 905 may perform a deep packet inspection of the packets making up the unicast control flow to identify the client application and to interpret the character of the request. APP router 905 will use this information to subsequently identify redundant unicast requests for the same content from other client consumers 740. As mentioned above, APP router 905 may terminate the $1^{st}$ unicast control flow and generate a new one addressed to one of regional servers 720 or local servers 730 with APP router 905 being the source address or may simply inspect the packets of the $1^{st}$ unicast control flow, collected the necessary information to identify redundant requests, then forward $1^{st}$ unicast control flow on and monitor the return link for a response. Alternatively, APP router 905 may operate as an apparent intermediary executing an embedded application and addressable by client consumers 740.

In a process block 1025, APP router 905 receives, identifies, and queues subsequent redundant requests for the same content from other client consumers 740, without forwarding the subsequent unicast control flows on to the servers. In a process block 1030, APP router 905 finally receives the content (e.g., a SKF for the commercial channel) requested from one of regional server 720 or local server 730 in response to the $1^{st}$ unicast control flow. The requested content arrives at APP router 905 in a unicast content flow either addressed to APP router 905 itself, or addressed to the one of client consumers 740 that issued the $1^{st}$ unicast control flow, depending upon whether APP router 905 terminated the $1^{st}$ unicast control flow, as discussed above.

In a process block 1035, APP router 905 replicates the unicast content flow and transmits these replicated flows to all client consumers 740 that previously issued redundant requests (process block 1040). In one embodiment, replicating the unicast content flow includes generating new unicast content flows specifically addressed to each client consumer 740. The new unicast content flows deliver payloads copied from the unicast content flow received at APP router 905 in response to the $1^{st}$ unicast control flow.

Finally, in process block 1045, APP router 905 commences to receive IGMP join requests from client consumers 740 to join the multicast content flow for the commercial channel and sync up with the multicast broadcast from one of head end content providers 705.

Figure 11:
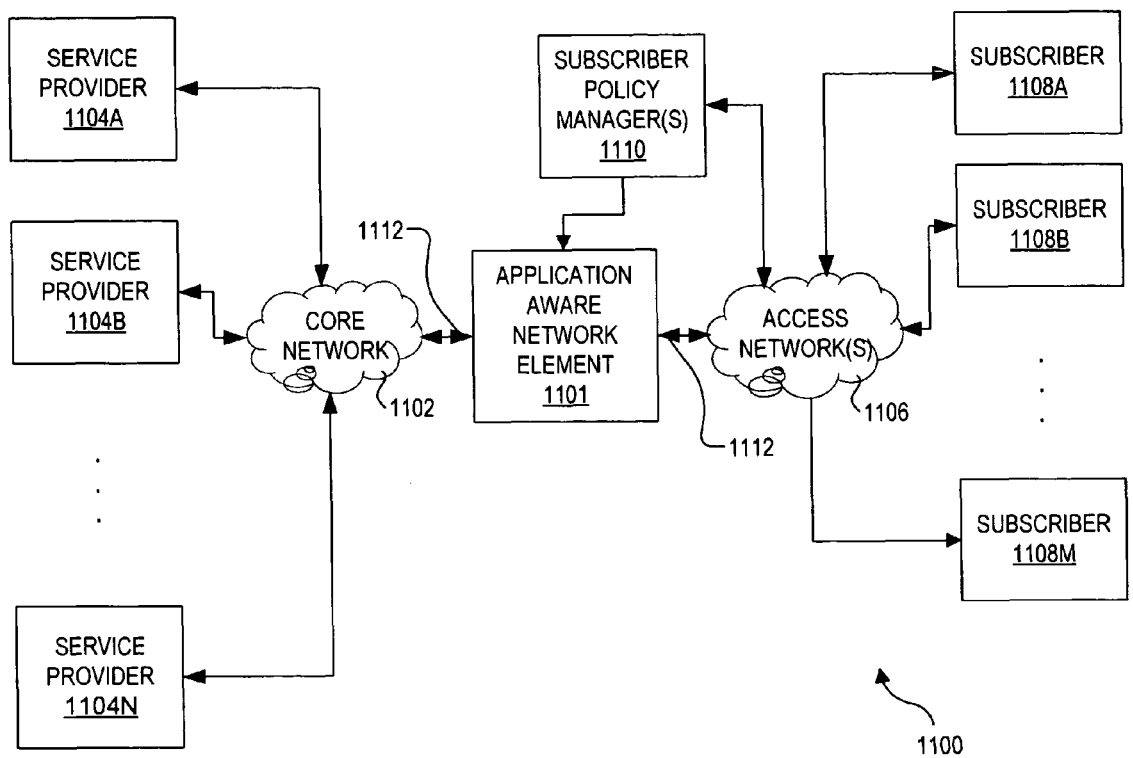
FIG. 11 is a block diagram illustrating an exemplary configuration using an application aware network element in a metro area network, in accordance with an embodiment of the invention.

FIG. 11 is a block diagram illustrating an exemplary configuration using an application aware network element 1101 in a metro area network 1100, in accordance with an embodiment of the invention. Application aware network element 1101 is one possible embodiment of APP router 405 or 905.

As depicted in FIG. 11, a metro area network 1100 is composed of two types of networks: a core network 1102 and one or more access networks 1106. The core network 1102 communicates data traffic from one or more service providers 1104A-1104N in order to provide services to one or more subscribers 1108A-1108M. Services supported by the core network 1102 include, but are not limited to, (1) a branded service, such as a Voice over Internet Protocol ("VoIP") or IPTV, from a branded service provider; (2) a licensed service, such as Video on Demand ("VoD"), through a licensed service provider and (3) traditional Internet access through an Internet Service Provider ("ISP").

Core network 1102 supports a variety of protocols (Synchronous Optical Networking (SONET), Internet Protocol (IP), Packet over SONET (POS), Dense Wave Division Multiplexing (DWDM), OSPF, BGP, ISIS, etc.) using various types of equipment (core routers, SONET add-drop multiplexers (ADM), DWDM equipment, etc.). Furthermore, core network 1102 communicates data traffic from the service providers 1104A-1104N to access network(s) 1106 across link(s) 1112. In general, link(s) 1112 may be a single optical, copper, or wireless link or may comprise several such optical, copper or wireless link(s). In the illustrated embodiment, application aware network element 1101 is strategically positioned between core network 1102 and access network(s) 1106 along link(s) 1112.

Access network(s) 1106 complement core network 1102 by aggregating the data traffic from the subscribers 1108A-1108M. Access network(s) 1106 may support data traffic to and from a variety of types of subscribers 1108A-1108M, (e.g. residential; corporate, mobile, wireless, etc.). Although the access network(s) 1106 may not include each type of subscriber (residential, corporate, mobile, etc), access(s) network 1106 will include at least one subscriber. Typically, access network(s) 1106 supports thousands of subscribers 1108A-1108M. Access network(s) 1106 aggregates data traffic from the subscribers over link(s) 1112 connecting to the core network 1102. Access networks support a variety of protocols (e.g., IP, Asynchronous Transfer Mode (ATM), Frame Relay, Ethernet, Digital Subscriber Line (DSL), Dynamic Host Configuration Protocol (DHCP), Point-to-Point Protocol (PPP), Point-to-Point Protocol over Ethernet (PPPoE), etc.) using various types of equipment (Edge router, Broadband Remote Access Servers (BRAS), Digital Subscriber Line Access Multiplexers (DSLAM), Switches, etc). The access network(s) 1106 uses subscriber policy manager(s) 1110 to set policies for individual ones and/or groups of subscribers. Policies stored in a subscriber policy manager(s) 1110 allow subscribers access to different ones of the service providers 1104A-N. Examples of subscriber policies are bandwidth limitations, traffic flow characteristics, amount of data, allowable services, etc.

In additional to the unicast flow replication described above, embodiments of application aware network element 1101 are capable of shaping traffic traversing link(s) 1112. Traffic shaping, a form of quality of service ("QoS"), is the process of regulating and smoothing the flow of network data traffic within a computer network. Restricting the bandwidth of the traffic flow is one way to regulate data traffic. There are a variety of ways to bring data traffic flow with a desired rate, including dropping or discarding data packets, buffering received data packets and re-transmitting the data packets at the desired rate, combinations of these (e.g., buffering packets when there is space in the buffer and dropping packets when there is not), etc. Buffering the data traffic flow allows the traffic shaping service node to smooth the data traffic flow. Smoothing removes the bursts of data traffic and shapes the data traffic into a constant flow of data traffic. Smoothing is advantageous for applications that depend on a constant flow of data traffic. For example, video-based applications, such VoD or video conferencing, or real-time voice applications (VoIP) benefit from a constant flow of data traffic. In general, application aware network element 1101 uses the subscriber policies contained in subscriber policy manager(s) 1110 for instruction on how to shape the data traffic from service providers 1104A-1104N and/or subscribers 1108A-1108M accordingly. Furthermore, application aware network element 1101 may use deep packet inspection at the application layer to determine what action to take on which packets or packet flows.

Figure 12:
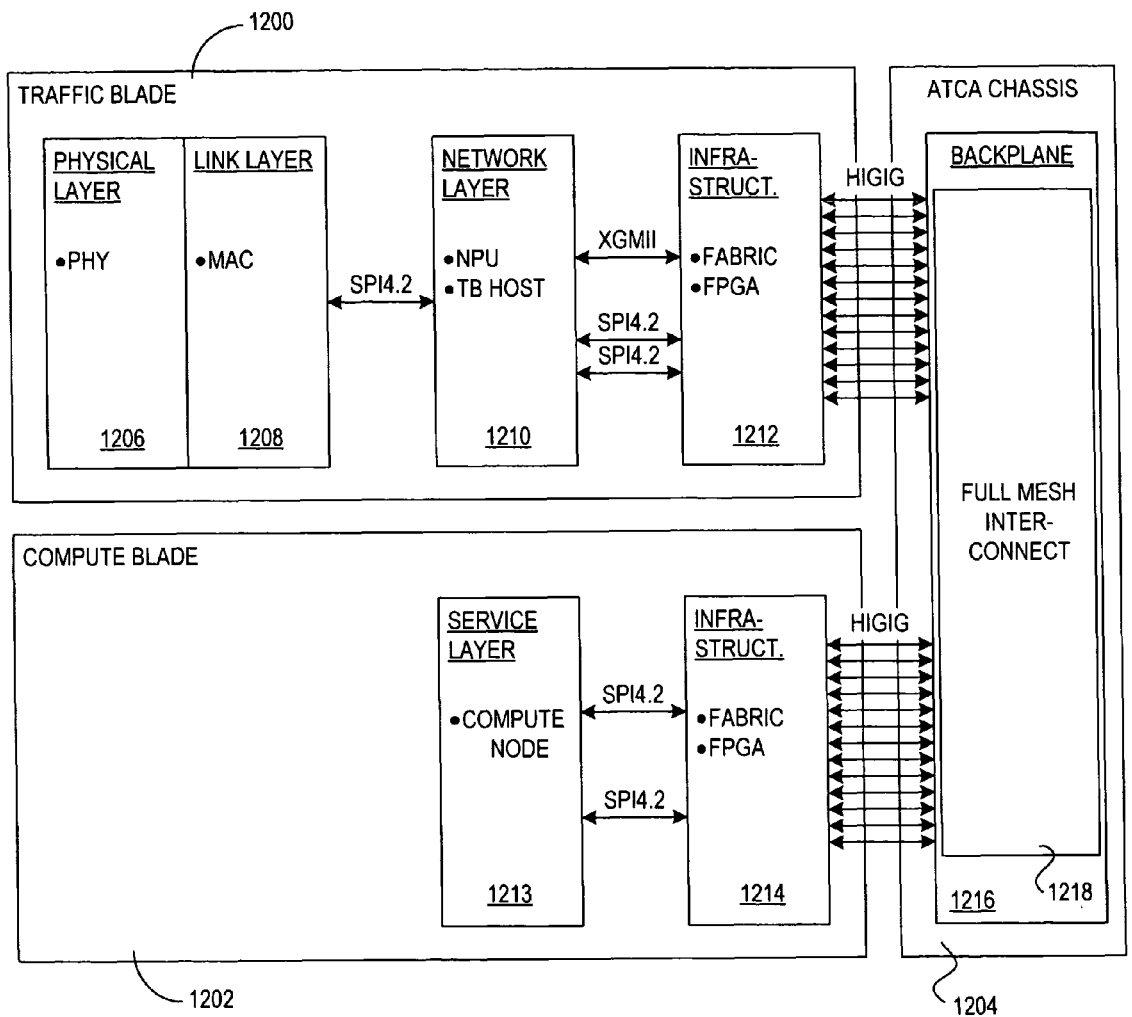
FIG. 12 is a block diagram illustrating interconnections between traffic blades and compute blades of an application aware network element, in accordance with an embodiment of the invention.

In accordance with architecture aspects of some embodiments, the aforementioned functions may be facilitated by various processing and storage resources hosted by associated line cards and the like, which are mounted in a common chassis. As shown in FIG. 12, from a datapath perspective, the hardware architecture of one embodiment of a application aware network element 1101 can be decomposed into three entities, Traffic Blades (TB) 1200 (generically referred to as a traffic module), Compute Blades (CB) 1202 (generically referred to as a compute module) and the chassis 1204. A TB 1200 can be further reduced to its physical and link layer portions 1206 and 1208, network layer components 1210, and infrastructure components 1212. Similarly, a CB 1202 provides Service Layer termination 1213 and infrastructure components 1214. In one embodiment, a CB can be further redefined to be an OAMP Blade based on its slot index (within chassis 1204). OAMP blades are a functional superset of CBs, adding operations, administration, maintenance and provisioning functionality (collectively referred to as OAMP card function or OAMP CF).

As illustrated in the embodiments herein, chassis 1204 comprises an Advanced Telecommunication and Computing Architecture (ATCA or AdvancedTCA®) chassis. The ATCA Chassis provides physical connectivity between the blades via a passive backplane 1216 including a full-mesh interconnect 1218. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

The ATCA 3.0 base specification (approved Dec. 30, 2002), which is being carried out by the PCI Industrial Computer Manufacturers Group ("PICMG"), defines the physical and electrical characteristics of an off-the-shelf, modular chassis based on switch fabric connections between hot-swappable blades. (As used herein, the terms "board," "blade," and "card," are interchangeable.) This specification defines the frame (rack) and shelf (chassis) form factors, core backplane fabric connectivity, power, cooling, management interfaces, and the electromechanical specification of the ATCA-compliant boards. The electromechanical specification is based on the existing IEC60297 EuroCard form factor, and enables equipment from different vendors to be incorporated in a modular fashion with guaranteed interoperability. The ATCA 3.0 base specification also defines a power budget of 200 Watts (W) per board, enabling high performance servers with multi-processor architectures and multi gigabytes of on-board memory.

In addition to power input to ATCA boards, mating connectors on the boards and backplane are employed for coupling input/output (I/O) signals. Many of the ATCA boards, as well as other modular boards used for telecommunications and computer, such as but not limited to CompactPCI, employ very-high speed I/O channels. For example, Advanced Switching ("AS") employs a serial communication channel operating at Gigahertz+ frequencies. ATCA boards may also provide one or more I/O ports on their front panels, enabling an ATCA board to be coupled to other network resources.

Figure 13:
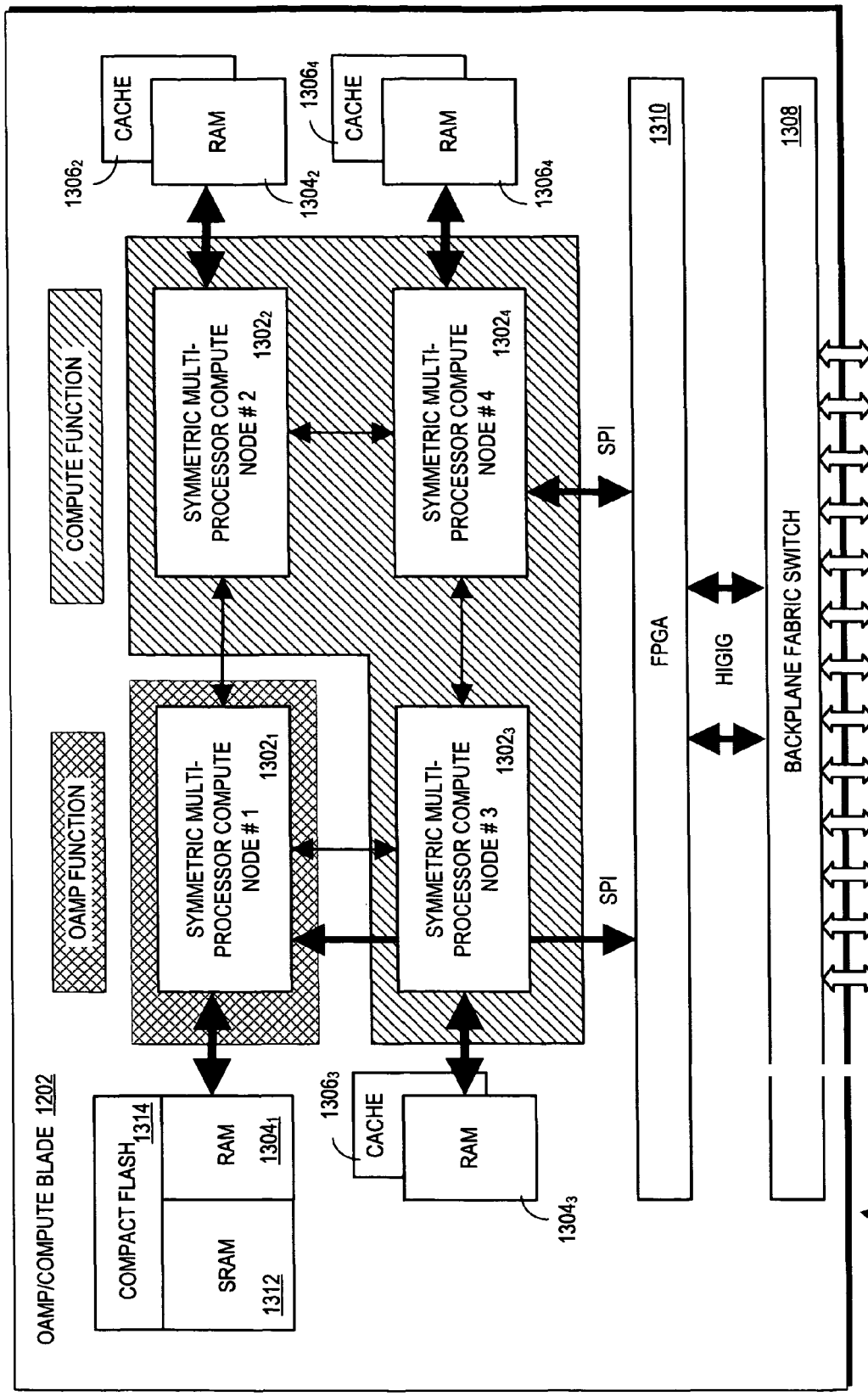
FIG. 13 is a block diagram illustrating a compute blade, in accordance with an embodiment of the invention.

An exemplary architecture 1300 for a compute blade 1202 is shown in FIG. 13. In one embodiment, a single compute blade (physical) architecture is employed for both Compute Blades and OAMP CF's. More particularly, under architecture 1300, a corresponding blade may be deployed to support both Compute Blade and OAMP functionality.

Compute Blade 1202 employs four multiple processor compute nodes $1302_{1-4}$. In general, each of compute nodes $1302_{1-4}$ functions as multiple processor resources, with each processor resource being associated with a logical processor. Accordingly, such processor resources may be implemented using separate processors, or processor chips employing multiple processor cores. For example, in the illustrated embodiment of FIG. 13, each of compute nodes $1302_{1-4}$ is implemented via an associated symmetric multi-core processor. Exemplary multi-core processors that may be implemented include, but are not limited to Broadcom 1480 and 1280 devices. Each of the compute nodes $1302_{1-4}$ is enabled to communicate with other compute nodes via an appropriate interface (e.g., bus or serial-based interfaces). For the Broadcom 1480 and 1280 devices, this interface comprises a "Hyper Transport" (HT) interface. Other native (standard or proprietary) interfaces between processors may also be employed.

As further depicted in architecture 1300, each compute nodes $1302_{1-4}$ is allocated various memory resources, including respective RAM $1304_{1-4}$. Under various implementations, each of compute nodes $1302_{1-4}$ may also be allocated an external cache $1306_{1-4}$, or may provide one or more levels of cache on-chip. In one embodiment, the RAM comprises ECC (Error Correction Code) RAM. In one embodiment, each compute node employs a NUMA (Non-Uniform Memory Access) cache coherency scheme. Other cache coherency schemes, such as MESI (Modified, Exclusive, Shared, Invalidated), may also be implemented for other embodiments.

Each Compute Blade 1202 includes a means for interfacing with ATCA mesh interconnect 1218. In the illustrated embodiment of FIG. 13, this is facilitated by a Backplane Fabric Switch 1308. Meanwhile, a field programmable gate array ("FPGA") 1310 containing appropriate programmed logic is used as an intermediary component to enable each of compute nodes $1302_{1-4}$ to access backplane fabric switch 1308 using native interfaces for each of the compute nodes and the fabric switch. In the illustrated embodiment, the interface between each of compute nodes $1302_{1-4}$ and the FPGA 1310 comprises an SPI (System Packet Interface) 4.2 interface, while the interface between the FPGA and backplane fabric switch 1308 comprises a Broadcom HiGig™ interface. It is noted that these interfaces are merely exemplary, and that other interface may be employed depending on the native interfaces of the various blade components.

In addition to local RAM (e.g., RAM $1304_1$), the compute node associated with the OAMP function (depicted in FIG. 13 as Compute Node #1) is provided with local SRAM 1312 and a non-volatile store (depicted as Compact flash 1314). The non-volatile store is used to store persistent data used for the OAMP function, such as provisioning information and logs. In Compute Blades that do not support the OAMP function, each compute node is provided with local RAM and a local cache.

In the embodiment illustrated in FIG. 13, compute blade 1202 is provisioned as an OAMP blade. In one configuration (as shown), one of the compute nodes is employed for performing OAMP functions (e.g., compute node $1302_1$), while the other three compute nodes (e.g., compute nodes $1302_{2-4}$) perform normal compute functions associated with compute blades, as described in further detail below. When a compute blade 1202 is provisioned as a compute blade, each of compute nodes $1302_{1-4}$ is available for performing the compute functions described herein.

Figure 14:
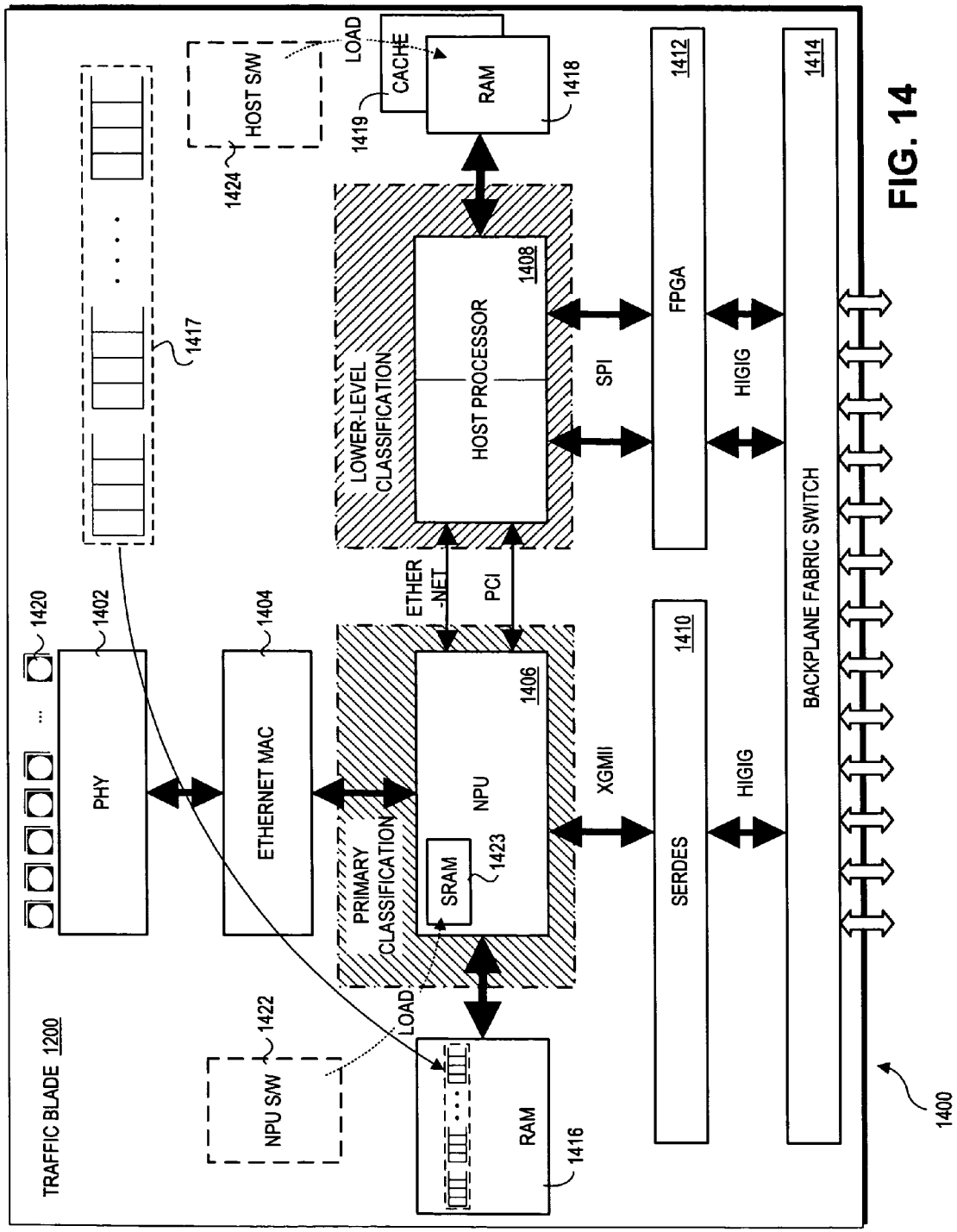
FIG. 14 is a block diagram illustrating a traffic blade, in accordance with an embodiment of the invention.

FIG. 14 shows an exemplary architecture 1400 for a traffic blade 1200. Architecture 1400 includes a PHY block 1402, an Ethernet MAC block 1404, a network processor unit (NPU) 1406, a host processor 1408, a SERDES interface 1410, an FPGA 1412, a backplane fabric switch 1414, RAM 1416 and 1418 and cache 1419. The traffic blade further includes one or more I/O ports 1420, which are operatively coupled to PHY block 1420. Depending on the particular use, the number of I/O ports may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

PHY block 1402 and Ethernet MAC block 1404 respectively perform layer 1 (Physical) and layer 2 (Data Link) functions, which are well-known in the art. In general, the PHY and Ethernet MAC functions may be implemented in hardware via separate components or a single component, or may be implemented in a combination of hardware and software via an embedded processor or the like.

One of the operations performed by a traffic blade is packet identification/classification. As discussed above, a multi-level classification hierarchy scheme is implemented for this purpose. Typically, a first level of classification, such as a 5-Tuple signature classification scheme, is performed by the traffic blade's NPU 1406. Additional classification operations in the classification hierarchy may be required to fully classify a packet (e.g., identify an application flow type). In general, these higher-level classification operations may be performed by the traffic blade's host processor 1408 and/or a processor on a compute blade, depending on the particular classification.

NPU 1406 includes various interfaces for communicating with other board components. These include an Ethernet MAC interface, a memory controller (not shown) to access RAM 1416, Ethernet and PCI interfaces to communicate with host processor 1408, and an XGMII interface. SERDES interface 1410 provides the interface between XGMII interface signals and HiGig signals, thus enabling NPU 1406 to communicate with backplane fabric switch 1414. NPU 1406 may also provide additional interfaces to interface with other components, such as an SRAM (Static Random Access Memory) interface unit to interface with off-chip SRAM (both not shown).

Similarly, host processor 1408 includes various interfaces for communicating with other board components. These include the aforementioned Ethernet and PCI interfaces to communicate with NPU 1406, a memory controller (on-chip or off-chip—not shown) to access RAM 1418, and a pair of SPI 4.2 interfaces. FPGA 1412 is employed to as an interface between the SPI 4.2 interface signals and the HiGig interface signals.

Typically, NPUs are designed for performing particular tasks in a very efficient manner. These tasks include packet forwarding and packet classification, among other tasks related to packet processing. To support such functionality, NPU 1406 executes corresponding NPU software 1422. This software is shown in dashed outline to indicate that the software may be stored (persist) on a given traffic blade (e.g., in a flash device or the like), or may be downloaded from an external (to the traffic blade) store during initialization operations, as described below. During run-time execution, NPU software 1422 is loaded into internal SRAM 1423 provided by NPU 1406.

Host processor 1408 is employed for various purposes, including lower-level (in the hierarchy) packet classification, gathering and correlation of flow statistics, and application of traffic profiles. Host processor 1408 may also be employed for other purposes. In general, host processor 1408 will comprise a general-purpose processor or the like, and may include one or more compute cores (as illustrated, in one embodiment a two-core processor is used). As with NPU 1406, the functionality performed by host processor is effected via execution of corresponding software (e.g., machine code and or virtual machine byte code), which is depicted as host software 1424. As before, this software may already reside on a traffic blade, or be loaded during blade initialization.

In one embodiment, host processor 1408 is responsible for initializing and configuring NPU 1406. Under one initialization scheme, host processor 1408 performs network booting via the DHCP (or BOOTP) protocol. During the network boot process, an operating system is loaded into RAM 1418 and is booted. The host processor then configures and initializes NPU 1406 via the PCI interface. Once initialized, NPU 1406 may execute NPU software 1422 on a run-time basis, without the need or use of an operating system.

Figure 15:
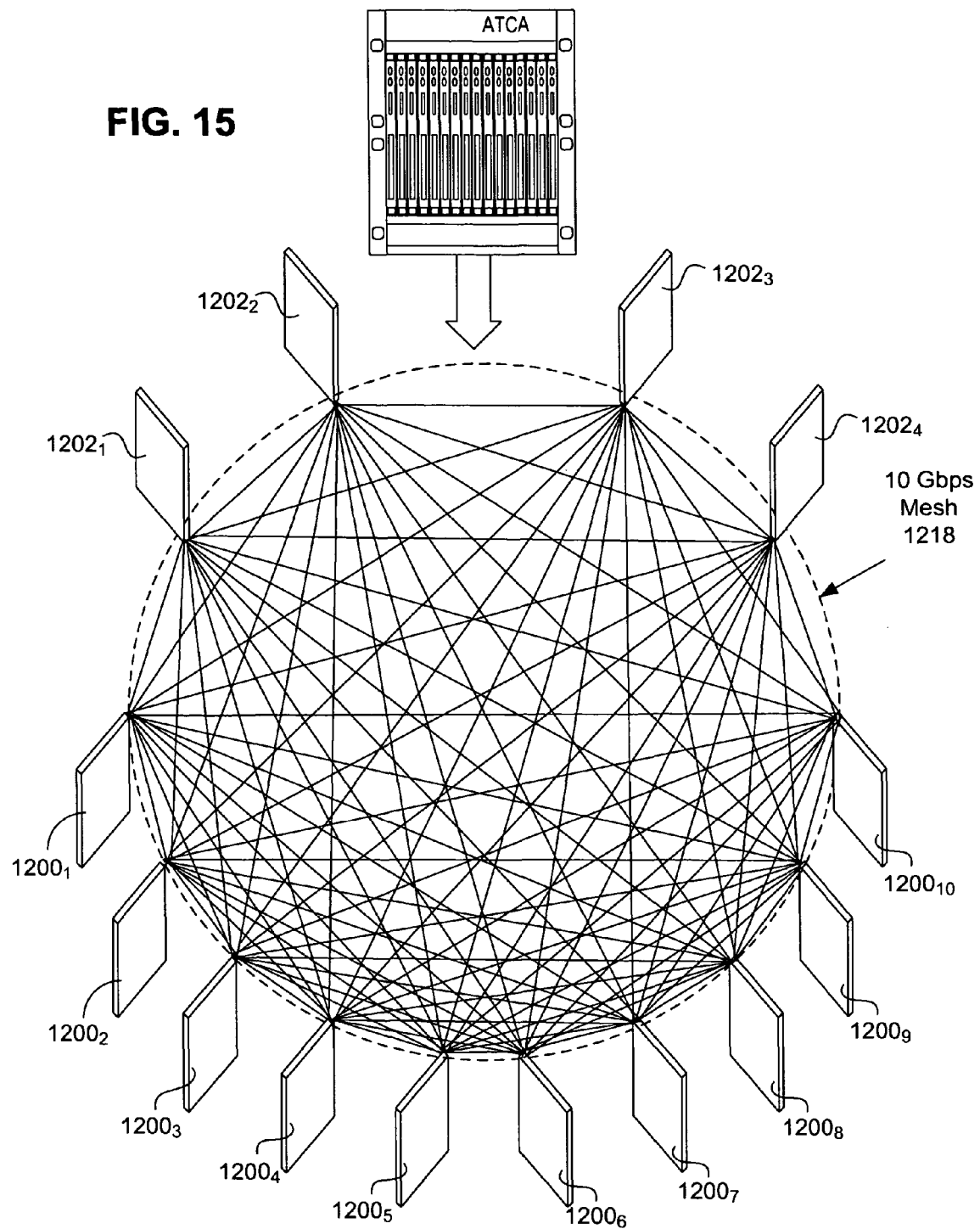
FIG. 15 is a schematic diagram illustrating one configuration of an application aware network element implemented via an Advanced Telecommunication and Computing Architecture ("ATCA") chassis, in accordance with an embodiment of the invention.

FIG. 15 is a schematic diagram illustrating the cross-connectivity provided by the ATCA backplane mesh interconnect used in one embodiment of application aware network element 1101. In the exemplary configuration shown in FIG. 15, an ATCA chassis 1204 is fully populated with 14 ATCA blades, with each blade installed in a respective chassis slot—in an actual implementation, the chassis may be populated with less blades or may include other types of blades in addition to compute and traffic blades. The illustrated configuration includes four compute blades $1202_{1-4}$, and 10 traffic blades $1200_{1-10}$, with one of the compute blades being provisioned to provide OAMP functions. As depicted by the interconnection mesh, each blade is communicatively-coupled with every other blade under the control of fabric switching operations performed by each blade's fabric switch. In one embodiment, mesh interconnect 1218 provides a 10 Gbps connection between each pair of blades, with an aggregate bandwidth of 280 Gbps.

In the illustrated embodiments, the application aware network element is implemented using a distributed architecture, wherein various processor and memory resources are distributed across multiple blades. To scale a system, one simply adds another blade. The system is further enabled to dynamically allocate processor tasks, and to automatically perform fail-over operations in response to a blade failure or the like. Furthermore, under an ATCA implementation, blades may be hot-swapped without taking the system down, thus supporting dynamic scaling.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine- accessible medium includes any mechanism that provides (e.g., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
   receiving a plurality of unicast control flows at a network element from a plurality of clients;
   forwarding one of the unicast control flows with unchanged destination and source addresses to a server;
   performing deep packet inspection down to an application layer on the unicast control flows in real-time at line rates by bifurcating a subset from each of the unicast control flows and sending the subset for each of the unicast control flows to a compute plane of the network element for processing;
   determining in the compute plane whether replicating a unicast content flow is appropriate based on the subsets of the unicast control flows;
   receiving the unicast content flow from the server at the network element in response to forwarding the one of the unicast control flows with the unchanged destination and source addresses; and
   replicating the unicast content flow at the network element as a plurality of replicated unicast content flows for transmission to the plurality of clients, if replicating is determined to be appropriate,
   wherein the network element operates as a fully transparent intermediary by retaining the source address identifying one of the clients corresponding to the one of the unicast control flows with the unchanged destination and source addresses forwarded to the server and by retaining an address of the server as a source address in each of the plurality of replicated unicast content flows sent to the clients.

2. The method of claim 1, wherein the network element comprises an application aware router capable of terminating the unicast control flows at an application layer and capable of interpreting application layer data within the unicast control flows.

3. The method of claim 1, wherein the plurality of unicast control flows each include source and destination addresses identifying a corresponding one of the plurality of clients and the server, respectively, the method further comprising:
   terminating the plurality of unicast control flows addressed to the server at the network element;
   generating a list of the plurality of unicast control flows requesting content from the server; and
   queuing redundant requests for the content after forwarding one of the requests to the server.

4. The method of claim 3, wherein replicating the unicast content flow as the plurality of replicated unicast content flows comprises:
   copying payload data containing the content received from the server at the network element into packets of the plurality of replicated content flows;
   generating new destination address data addressing corresponding corresponding ones of the plurality of clients for each of the queued requests; and
   inserting the new destination address data into the packets of the replicated unicast content flows.

5. The method of claim 1, wherein the unicast control flows include control signals from client-side applications executing on the plurality of clients, the control signals requesting media content from a server-side application executing on the server, and wherein the unicast content flow received from the server includes the media content.

6. The method of claim 5, wherein the media content comprises a key frame of a video image for Internet Protocol ("IP") television ("IPTV").

7. The method of claim 6, wherein the server comprises a regional or local server, the method further comprising:

forwarding a first multicast broadcast for a first channel from an IPTV server to the plurality of clients, wherein receiving the plurality of unicast control flows includes receiving the plurality of unicast control flows in response to a commercial insertion trigger identifying a commercial break in the first channel, the unicast control flows requesting a channel change to a second channel to receive regional or local commercials during the commercial break, and wherein the unicast content flow comprises a burst of media content from the regional or local server to enable the plurality of clients to sync up with a second multicast broadcast from the IPTV server for the second channel.

8. A machine-accessible medium that stores instructions that, if executed by a machine, will cause the machine to perform operations comprising:

executing an application in a network element, the application mimicking a server-side application on a server to a plurality of clients;

receiving a plurality of unicast control flows at a traffic plane of the network element from the plurality of clients;

forwarding one of the unicast control flows to the server from the traffic plane;

receiving a unicast content flow from the server at the traffic plane of the network element in response to forwarding the one of the unicast control flows;

performing deep packet inspection down to an application layer on the unicast content flow in real-time at line rates by bifurcating a subset of the unicast content flow and sending the subset to a compute plane of the network element for processing;

determining in the compute plane whether replicating the unicast content flow is appropriate based on the subset of the unicast content flow; and replicating the unicast content flow at the network element as a plurality of replicated unicast content flows for transmission to the plurality of clients, wherein the network element operates as an apparent intermediary to the server by replacing a source address within the one of the unicast control flows forwarded to the server to identify the network element, wherein the network element operates as a transparent intermediary to the plurality of clients by retaining an address of the server as a source address in each of the plurality of replicated unicast content flows.

9. The machine-accessible medium of claim 8, further storing instructions that, if executed by the machine, will cause the machine to perform further operations, comprising:

interpreting application layer data within the unicast control flows; and terminating the unicast control flows at an application layer in the network element.

10. The machine-accessible medium of claim 8, the machine-accessible medium further storing instructions that, if executed by the machine, will cause the machine to perform further operations, comprising:

terminating the plurality of unicast control flows addressed to the server at the network element;

generating a list of the plurality of unicast control flows requesting identical content from the server; and queuing requests for the identical content after forwarding one of the requests to the server.

11. The machine-accessible medium of claim 10, wherein replicating the unicast content flow as the plurality of replicated unicast content flows comprises:

copying payload data containing the identical content received from the server at the network element into packets of the plurality of replicated content flows;

generating new destination address header data addressing corresponding ones of the plurality of clients for each of the queued requests; and inserting the new destination address header data into the packets of the replicated unicast content flows.

12. The machine-accessible medium of claim 8, wherein the unicast control flows include control signals from client-side applications executing on the plurality of clients, the control signals requesting media content from a server-side application executing on the server, and wherein the unicast content flow received from the server includes the media content.

13. The machine-accessible medium of claim 12, wherein the media content comprises a key frame of a video image for Internet Protocol ("IP") television ("IPTV").

14. The machine-accessible medium of claim 13, wherein the server comprises a regional or local server, the machine-accessible medium further storing instructions that, if executed by the machine, will cause the machine to perform further operations, comprising:

forwarding a first multicast broadcast for a first channel from an IPTV server to the plurality of clients, wherein receiving the plurality of unicast control flows includes receiving the plurality of unicast control flows in response to an insertion point trigger identifying a commercial break in the first channel, the unicast control flows requesting a channel change to a second channel to receive regional or local commercials during the commercial break, and wherein the unicast content flow comprises a burst of media content from the regional or local server to enable the plurality of clients to synch up with a second multicast broadcast from the IPTV server.

15. A network element, comprising:

a chassis including an interconnect;

at least one traffic module installed in the chassis and coupled to the interconnect;

at least one compute module installed in the chassis and coupled to the interconnect; and software components distributed across the traffic and compute modules, the software components to execute on processing elements of the traffic and compute modules to perform operations including:

receiving unicast control flows addressed to a server from two or more network clients;

blocking redundant unicast control flow requests during a finite window of time, the finite window of time being equal to a period of time between an arrival of a first of the unicast control flows and an arrival of a unicast content flow from the server in response to the first of the unicast control flows;

performing deep packet inspection down to an application layer on the unicast control flows in real-time by bifurcating at least a subset from each of the unicast control flows at one or more of the traffic modules and sending at least the subset for each of the unicast control flows from the one or more traffic modules to one of the compute modules for processing;

determining in the one of the compute modules whether replicating the unicast content flow is appropriate based on the subsets of the unicast control flows;

receiving the unicast content flow from the server, the unicast content flow addressed to at least one of the two or more network clients; and replicating the unicast content flow to other clients identified in a list as replicated unicast content flows.

16. The network element of claim 15 including further software components to perform operations including:
    intercept the unicast control flows addressed to the server from the other clients, the unicast control flows including redundant requests for content previously requested by the network client;
    terminate the unicast control flows at the network element; and
    generate the list based at least in part on the redundant requests of the terminated unicast control flows.

17. The network element of claim 16, wherein the software components to intercept the unicast control flows addressed to the server from the other clients include software components to classify and interpret packets of the intercepted unicast control flows at an application layer protocol.

18. The network element of claim 15, wherein the network element comprises an application aware router, and wherein the application aware router includes an application for terminating unicast control flows from the client.

19. The network element of claim 18, wherein the application mimics server-side application functionality of the server transparently to the client.

20. The network element of claim 15, wherein classifying packets of the unicast content flow to identify the application associated with the unicast content flow comprises:
    executing a preliminary classification of the packets received on a data path within the traffic modules to determine whether additional classification should be executed; and
    replicating the packets to a compute path within the compute modules to perform additional application layer classification while the packets continue along the data path, if the preliminary classification indicated to do so.

21. The network element of claim 15, wherein the software components operate the network element as an apparent intermediary to the clients by replacing a first source address in the unicast content flow designating the server with a second source address identifying the network element in each of the replicated unicast content flows sent to the clients.

22. A machine-accessible medium that stores instructions that, if executed by a machine, will cause the machine to perform operations comprising:
    receiving a plurality of unicast control flows at a traffic plane of a network element from a plurality of clients;
    forwarding one of the unicast control flows to a server from the traffic plane;
    performing deep packet inspection down to an application layer on the unicast control flows in real-time at line rates by bifurcating a subset from each of the unicast control flows and sending the subset for each of the unicast control flows to a compute plane of the network element for processing;
    determining in the compute plane whether replicating a unicast content flow is appropriate based on the subsets of the unicast control flows;
    receiving a unicast content flow from the server at the traffic plane of the network element in response to forwarding the one of the unicast control flows; and
    replicating the unicast content flow at the network element as a plurality of replicated unicast content flows for transmission to the plurality of clients.

23. The machine-accessible medium of claim 22, wherein the machine-accessible medium further stores instructions that, if executed by the machine, will cause the machine to perform further operations, comprising:
    executing an application in the network element, the application mimicking a server-side application on the server to the plurality of clients.

24. The machine-accessible medium of claim 22, wherein the unicast control flows include control signals from client-side applications executing on the plurality of clients, the control signals requesting media content from a server-side application executing on the server, and wherein the unicast content flow received from the server includes the media content.

* * * * *